(12) United States Patent
Himura et al.

(10) Patent No.: US 9,056,996 B2
(45) Date of Patent: Jun. 16, 2015

(54) INK-JET RECORDING INK SET, RECORDING HEAD, INK-JET RECORDING APPARATUS, AND INK-JET RECORDING METHOD

(71) Applicant: CANON FINETECH INC., Misato-shi, Saitama-ken (JP)

(72) Inventors: Eriko Himura, Saitama (JP); Takahiro Tsutsui, Matsudo (JP); Yuusuke Sumikawa, Kashiwa (JP)

(73) Assignee: Canon Finetech Inc., Misato-shi (JP)

( * ) Notice: Subject to any disclaimer, the term of this patent is extended or adjusted under 35 U.S.C. 154(b) by 0 days.

(21) Appl. No.: 14/475,982

(22) Filed: Sep. 3, 2014

(65) Prior Publication Data

US 2015/0070449 A1    Mar. 12, 2015

(30) Foreign Application Priority Data

Sep. 6, 2013  (JP) .................................. 2013-185463

(51) Int. Cl.
*B41J 2/17*    (2006.01)
*C09D 11/328*   (2014.01)
(Continued)

(52) U.S. Cl.
CPC ........... *C09D 11/328* (2013.01); *B41J 2/17563* (2013.01); *C09D 11/38* (2013.01); *C09D 11/40* (2013.01)

(58) Field of Classification Search
USPC .................. 347/86, 89, 100; 106/31.89, 31.58
See application file for complete search history.

(56) References Cited

U.S. PATENT DOCUMENTS 5,189,154 A    2/1993  Gregory et al.
(Continued)

FOREIGN PATENT DOCUMENTS

EP    0468647 A1    1/1992
(Continued)

OTHER PUBLICATIONS

Feb. 3, 2015 European Search Report in European Patent Appln. No. 14183650.2.

*Primary Examiner* — Lam Nguyen
(74) *Attorney, Agent, or Firm* — Fitzpatrick, Cella, Harper & Scinto

(57) ABSTRACT

An ink-jet recording ink set includes: an ink (I) containing a dye D1, a compound C1 represented by the following formula and having a U+V of S1, and water; and an ink (II) containing a dye D2, a compound C2 represented by the following formula and having a U+V of S2, and water in which in case that a surface tension γL1 (mN/m) of an evaluation liquid L1 obtained by adding, to a 5 mass % aqueous solution of the dye D1, a compound C3 in an amount corresponding to 1 mass % of the aqueous solution, and a surface tension γL2 (mN/m) of an evaluation liquid L2 obtained by adding, to a 5 mass % aqueous solution of the dye D2, the compound C3 in an amount corresponding to 1 mass % of the aqueous solution satisfy a relationship of γL1−γL2≥10 (mN/m), the S1 and the S2 satisfy a relationship of 2≤S2−S1≤7.

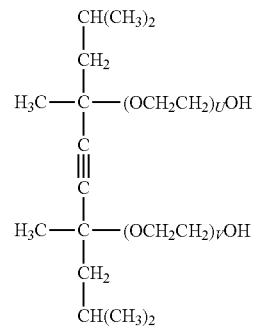

10 Claims, 7 Drawing Sheets

(51) Int. Cl.
  *B41J 2/175* (2006.01)
  *C09D 11/38* (2014.01)
  *C09D 11/40* (2014.01)

(56) References Cited

U.S. PATENT DOCUMENTS

| | | | |
|---|---|---|---|
| 5,262,527 | A | 11/1993 | Gregory et al. |
| 5,268,459 | A | 12/1993 | Gregory et al. |
| 6,051,057 | A * | 4/2000 | Yatake et al. ............ 106/31.58 |
| 7,648,943 | B2 | 1/2010 | Fujiwara et al. |
| 7,892,340 | B2 * | 2/2011 | Namba et al. ............ 106/31.89 |
| 8,328,346 | B2 | 12/2012 | Kudo et al. |
| 8,602,544 | B2 | 12/2013 | Kawabe et al. |
| 2002/0077385 | A1 | 6/2002 | Miyabayashi |
| 2003/0159617 | A1 | 8/2003 | Nishita et al. |
| 2007/0070159 | A1 | 3/2007 | Ogawa |
| 2007/0109390 | A1 | 5/2007 | Yamakami et al. |
| 2007/0120928 | A1 | 5/2007 | Ma et al. |
| 2014/0313265 | A1 | 10/2014 | Himura et al. |

FOREIGN PATENT DOCUMENTS

| | | |
|---|---|---|
| EP | 0468648 A1 | 1/1992 |
| EP | 0468649 A1 | 1/1992 |
| EP | 1 925 645 A1 | 5/2008 |
| JP | 06-25573 A | 2/1994 |
| JP | 2004-075767 A | 3/2004 |
| JP | 2006-143989 A | 6/2006 |
| JP | 2011-140636 A | 7/2011 |
| JP | 2012-25156 A | 2/2012 |
| JP | 2013-14111 A | 1/2013 |

* cited by examiner

INK-JET RECORDING INK SET, RECORDING HEAD, INK-JET RECORDING APPARATUS, AND INK-JET RECORDING METHOD

BACKGROUND OF THE INVENTION

1. Field of the Invention

The present invention relates to an ink-jet recording ink set, a recording head, an ink-jet recording apparatus, and an ink-jet recording method.

2. Description of the Related Art

An ink-jet recording method is a recording method for forming an image by causing a small-size ink droplet ejected from a recording head to fly onto plain paper or a dedicated glossy medium. Because a recording apparatus has become less expensive and improved in recording speed, the above-mentioned recording method has rapidly enhanced its popularity in recent years. Further, because the image quality has become higher in the recording method to enable output of a photographic image comparable to a silver-halide photograph, and because a digital camera has rapidly enhanced its popularity, the above-mentioned recording method has become more popular also as a method of outputting a photographic image.

In recent years, a technology such as an extreme reduction in size of an ink droplet to be flown or the expansion of a color gamut in association with the introduction of a multi-color ink has been introduced into the recording method, and hence an additional improvement in image quality has been progressing. Therefore, a coloring material, in particular, a dye has been required to achieve higher levels of color developability and fastness properties (such as light resistance and ozone resistance) of an image than conventional ones.

For example, an azo dyestuff having a specific dyestuff skeleton has been proposed as a dye having high fastness properties against light and ozone (Japanese Patent Application Laid-Open No. 2006-143989). Japanese Patent Application Laid-Open No. 2006-143989 describes that the azo dyestuff has sufficient fastness properties against light, heat, humidity, and an active gas in an environment.

In addition, a dye for a magenta ink having a specific molecular structure has been proposed (Japanese Patent Application Laid-Open No. 2012-25156). Japanese Patent Application Laid-Open No. 2012-25156 describes that the dye has high fixability to the ink-receiving layer of a recording medium and improves the fastness properties of an image such as bronze resistance.

The dye described in Japanese Patent Application Laid-Open No. 2006-143989 or Japanese Patent Application Laid-Open No. 2012-25156 has an advantage in that the dye is excellent in fastness properties against light and ozone. However, when an ink set is constituted by combining an ink containing the dye and an ink containing any other dye, a problem arises in that the ink containing the dye cannot obtain an ejection characteristic comparable to that of the ink containing the other dye. As a result, a problem arises in that the respective inks of the ink set are not uniformly ejected and hence the printing quality of an image reduces.

The problem arises probably because the dye is designed to have such a molecular structure that dye molecules easily associate with each other, i.e., a molecular structure having high hydrophobicity in order that its fastness properties against light and ozone may be improved. That is, the ink containing the dye having high hydrophobicity and an ink containing an ordinary hydrophilic dye have different properties, and hence a difference is assumed to occur between the ejection characteristics of the inks even when the inks have the same ink composition.

In particular, the miniaturization of an ink ejection orifice has been progressing in a recent ink-jet recording apparatus in association with an improvement in quality of an image. In addition, a recording head in which an ejection condition is strict and ejection stability is hard to secure like a line-type head or a gas-liquid separation-type recording head has started to appear. Therefore, the problem may become additionally serious.

SUMMARY OF THE INVENTION

The present invention has been made to solve the problems of the related art. That is, the present invention provides the following ink-jet recording ink set, a recording head, an ink-jet recording apparatus, and an ink-jet recording method. When the ink set is constituted by combining an ink containing a dye having high hydrophobicity with any other ink, the respective inks of the ink set can be uniformly ejected and hence a reduction in printing quality of an image can be effectively prevented.

The inventors of the present invention have made extensive studies on the problems. As a result, the inventors have found the fact that when an acetylene glycol-based surfactant effective in improving the wettability of an ink is used, the dye having high hydrophobicity exhibits a high adsorbing effect on the surfactant (i.e., has a large hydrophobic interaction with the surfactant) and suppresses the function of the surfactant. In addition, the inventors have considered that when the ink containing the dye having high hydrophobicity and the other ink are caused to differ from each other in ethylene oxide average addition number of acetylene glycol, the viscosities, surface tensions, wettabilities, and the like of the respective inks constituting the ink set can be uniformized, and hence the problems can be solved. Thus, the inventors have completed the present invention. That is, according to the present invention, there are provided the following ink set, recording head, ink-jet recording apparatus, and ink-jet recording method.

(1) Ink Set

According to one embodiment of the present invention, there is provided an ink-jet recording ink set, including a combination of inks of a plurality of colors having different hues, in which an ink (I) as an ink of one color selected from the inks of the plurality of colors includes an ink containing a dye D1, a compound C1 represented by the following general formula (1) and having an ethylene oxide average addition number U+V of S1, and water, in which an ink (II) as an ink of one color except the ink (I) selected from the inks of the plurality of colors includes an ink containing a dye D2, a compound C2 represented by the following general formula (1) and having an ethylene oxide average addition number U+V of S2, and water, and in which in case that a surface tension $\gamma L1$ (mN/m) of an evaluation liquid L1 obtained by adding, to a 5 mass % aqueous solution of the dye D1, a compound C3 represented by the following general formula (1) and having an ethylene oxide average addition number U+V of 10 in an amount corresponding to 1 mass % of the aqueous solution, and a surface tension $\gamma L2$ (mN/m) of an evaluation liquid L2 obtained by adding, to a 5 mass % aqueous solution of the dye D2, the compound C3 in an amount corresponding to 1 mass % of the aqueous solution satisfy a relationship of $\gamma L1 - \gamma L2 \geq 10$ (mN/m), the ethylene oxide average addition number S1 of the compound C1 incorporated into the ink (I) and the ethylene oxide average addition number S2 of the compound C2 incorporated into the ink (II) satisfy a relationship of $2 \leq S2-S1 \leq 7$.

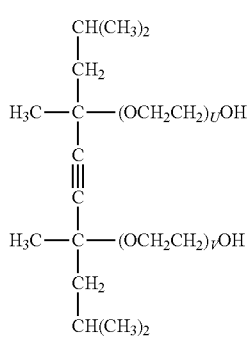

General formula (1)

According to one embodiment of the present invention, in case that the ink set is constituted by combining an ink containing a dye having high hydrophobicity with any other ink, the respective inks of the ink set can be uniformly ejected and hence a reduction in printing quality of an image can be effectively prevented.

Further features of the present invention will become apparent from the following description of exemplary embodiments with reference to the attached drawings.

DESCRIPTION OF THE EMBODIMENTS

Figure 1A:
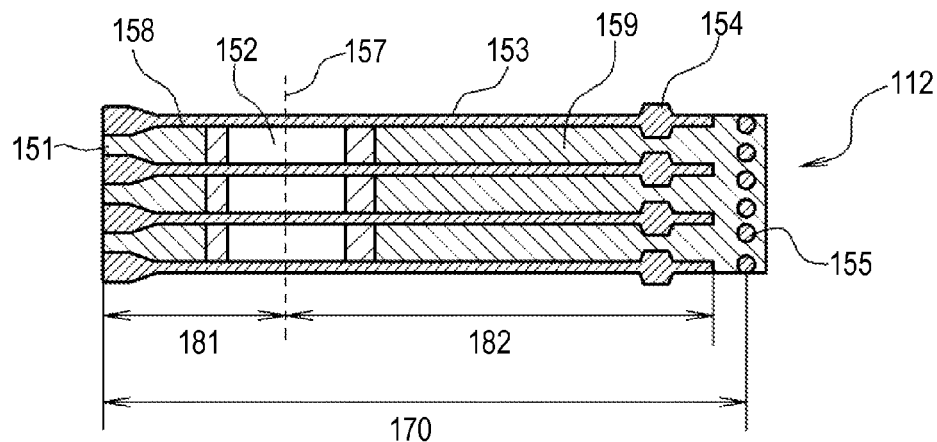
FIG. 1A is a top view schematically illustrating an internal structure of nozzles of a recording head.

Preferred embodiments of the present invention will now be described in detail in accordance with the accompanying drawings.

Now, the present invention is described in detail. However, the present invention is not limited to the following embodiments and comprehends all objects having matters to define the invention. Note that, the term "recording" as used herein comprehends not only the case where meaningful information such as a letter, a figure, or a symbol is formed on a recording medium but also the case where an image, design, pattern, or the like having no particular meaning is formed thereon.

(1) Ink Set

The term "ink set" refers to an ink-jet recording ink set in which inks of a plurality of colors having different hues are combined. The term "hue" as used herein includes not only a chromatic color but also an achromatic color such as a black color. In addition, as the term "plurality of colors" suggests, inks of two or more colors have only to be combined. The ink set can be, for example, an ink set in which at least two colors selected from four colors, i.e., yellow, magenta, cyan, and black colors are combined.

The term "ink" refers to a liquid containing a coloring material. An ink to be used in the ink set of the present invention is an ink containing at least a dye, an acetylene glycol-based surfactant, and water. That is, the ink is an aqueous dye ink.

The ink set of the present invention is an ink set in which at least an ink (I) and an ink (II) are combined. That is, the ink (I) is an ink of one color selected from the inks of the plurality of colors, and the ink (II) is an ink of one color except the ink (I) selected from the inks of the plurality of colors.

The ink (I) is an ink containing a dye D1, a compound C1 represented by the following general formula (1) and having an ethylene oxide average addition number U+V of S1, and water. Meanwhile, the ink (II) is an ink containing a dye D2, a compound C2 represented by the following general formula (1) and having an ethylene oxide average addition number U+V of S2, and water. That is, the ink (I) and the ink (II) have the following characteristics in common: the inks each contain a dye as a coloring material; the inks each contain an ethylene oxide average adduct of acetylene glycol represented by the following general formula (1) as an acetylene glycol-based surfactant; and the inks each contain water as a medium. However, degrees of hydrophobicity of the dyes of the ink (I) and the ink (II) largely differ from each other, and the ethylene oxide average addition numbers of the acetylene glycol-based surfactants also differ from each other according to the degrees of hydrophobicity of the dyes.

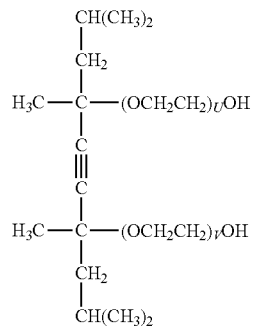

General formula (1)

(1-1) Dye

As described in the foregoing, the present invention is based on the premise that there is a large difference in degree of hydrophobicity between the dye D1 as a constituent component of the ink (I) and the dye D2 as a constituent component of the ink (II).

Whether there is a large difference between the degrees of hydrophobicity of the dyes is judged depending on whether a surface tension γL1 (mN/m) of an evaluation liquid L1 obtained by adding, to a 5 mass % aqueous solution of the dye D1, a compound C3 represented by the general formula (1) and having an ethylene oxide average addition number U+V of 10 in an amount corresponding to 1 mass % of the aqueous solution, and a surface tension γL2 (mN/m) of an evaluation liquid L2 obtained by adding, to a 5 mass % aqueous solution of the dye D2, the compound C3 in an amount corresponding to 1 mass % of the aqueous solution satisfy a relationship of $\gamma L1-\gamma L2 \geq 10$ (mN/m).

That is, the evaluation liquid L1 or L2 is prepared by adding, to the 5 mass % aqueous solution of the dye D1 (or the dye D2), the compound C3 in an amount corresponding to 1 mass % of the aqueous solution, and the surface tensions $\gamma L1$ and $\gamma L2$ of the evaluation liquids L1 and L2 are measured, and when a difference between the surface tensions $\gamma L1$ and $\gamma L2$ is 10 or more, it is judged that there is a large difference between the degrees of hydrophobicity of the dye D1 and the dye D2. When the difference between the $\gamma L1$ and the $\gamma L2$ is 10 or more, the ejection characteristics of the plurality of inks constituting the ink set differ from each other, and hence the printing quality of an image reduces in some cases.

It is because of the following reason that the content of the dye in the evaluation liquid L1 or L2 is set to 5 mass %: in the case of an ink-jet recording ink, the content of a dye in the total mass of the ink is preferably mass % or less. In addition, it is because of the following reason that an alkylene glycol having an ethylene oxide average addition number of 10 is used as the compound C3: the compound has a relatively low HLB value and good adsorptivity to a dye while having no fear of being dissolved in water. The HLB value is a value representing the degrees of the affinities of a surfactant for water and oil. For example, "Acetylenol E100" manufactured by Kawaken Fine Chemicals Co., Ltd. can be used as the compound C3. It is because of the following reason that the addition amount of the compound C3 is set to an amount corresponding to 1 mass %: a concentration equal to or more than the critical micelle concentration (CMC) of the compound C3 for water should be achieved. The surface tension of each evaluation liquid can be measured by the same method as a method of measuring the surface tension of an ink to be described later.

As long as the dye D1 and the dye D2 satisfy the above-mentioned relationship, the molecular structures and the like of the dyes are not particularly limited. However, a water-soluble dye is preferably used. A dye having high hydrophobicity like a dye showing fastness properties against light and ozone can also be used. For example, a yellow dye, magenta dye, cyan dye, or black dye listed below can be suitably used. It should be noted that not only a conventionally known dye to be described later but also a newly synthesized or produced dye can be used as any such dye. The dye D1, the dye D2, a dye serving as a constituent component of any other ink constituting the ink set, and the like have only to be appropriately selected from those dyes and used.

Examples of the yellow dye may include:

(1) acid dyes such as C.I. Acid Yellow 11, 17, 23, 25, 29, 42, 49, 61, and 71; and (2) direct dyes such as C.I. Direct Yellow 12, 24, 26, 44, 86, 87, 98, 100, 130, and 142.

Examples of the magenta dye may include:

(1) acid dyes such as C.I. Acid Red 1, 6, 8, 32, 35, 37, 51, 52, 80, 85, 87, 92, 94, 115, 180, 254, 256, 289, 315, and 317; and (2) direct dyes such as C.I. Direct Red 1, 4, 13, 17, 23, 28, 31, 62, 79, 81, 83, 89, 227, 240, 242, and 243.

In addition, a magenta dye having high hydrophobicity can be, for example, a compound (2) represented by the following general formula (2) disclosed in Japanese Patent Application Laid-Open No. 2011-140636.

General formula (2)

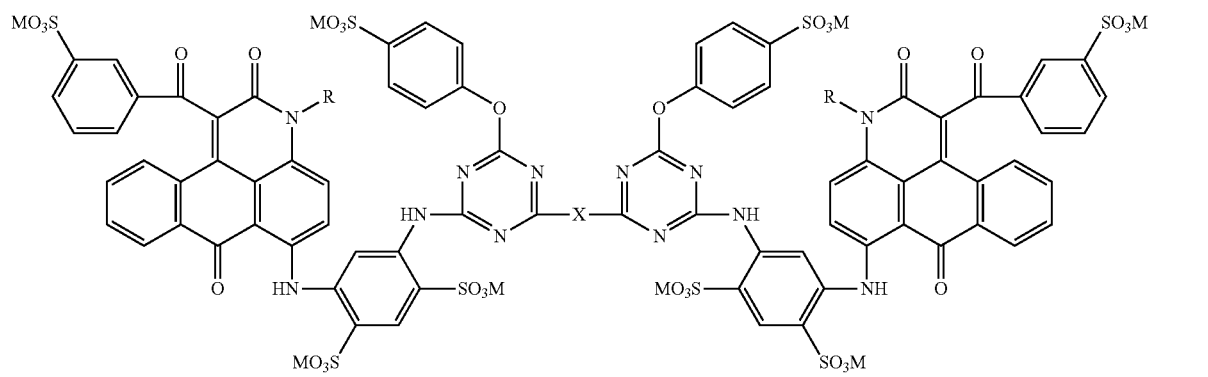

In the general formula (2), R's each independently represent a hydrogen atom, an alkyl group, a hydroxyalkyl group, a cyclohexyl group, a monoalkylaminoalkyl group, or a dialkylaminoalkyl group, M's each independently represent a hydrogen atom, an alkali metal, ammonium, or an organic ammonium, and X represents a linking group (divalent functional group). The compound is preferably, for example, a compound in which R's each represent a methyl group, X represents a $CH_2$—NH—NH—$CH_2$ group, and M's each represent a hydrogen atom, or a compound in which R's each represent an ethyl group, X represents a NH—$C_2H_6$—NH group, and M's each represent a sodium atom.

Further, another example of the magenta dye having high hydrophobicity can be a compound (3) represented by the following general formula (3) disclosed in Japanese Patent Application Laid-Open No. 2006-143989.

General formula (3)

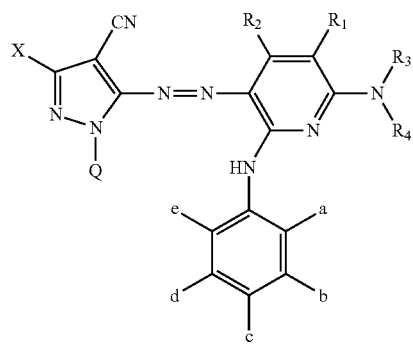

In the general formula (3), X represents a hydrogen atom, an aliphatic group, an aromatic group, or a heterocyclic group.

$R_1$ and $R_2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfonic group, or a heterocyclic thio group. Each of those groups may be further substituted.

$R_3$ and $R_4$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each of those groups may be further substituted.

In addition, $R_1$ and $R_3$ or $R_3$ and $R_4$ may be bonded to form a five-membered ring or a six-membered ring.

a and e each independently represent an alkyl group, an alkoxy group, or a halogen atom; provided that when both of a and e represent alkyl groups, the total number of carbon atoms constituting the alkyl groups is 3 or more and the groups may be further substituted. b, c, and d each independently represent a group selected from the group consisting of the groups given as the examples of $R_1$ and $R_2$, and a and b or e and d may be bonded to form a ring.

Q represents a hydrogen atom, an aliphatic group, an aromatic group, or a heterocyclic group. Each of those groups may be further substituted. However, at least one ionic group is present in the general formula (3).

A preferred specific example of the compound represented by the general formula (3) can be, for example, a compound M1 represented by the following formula (4). In the compound M1, sulfonic groups each take the form of a free acid; provided that part or all of the sulfonic groups may each take the form of an alkali metal salt.

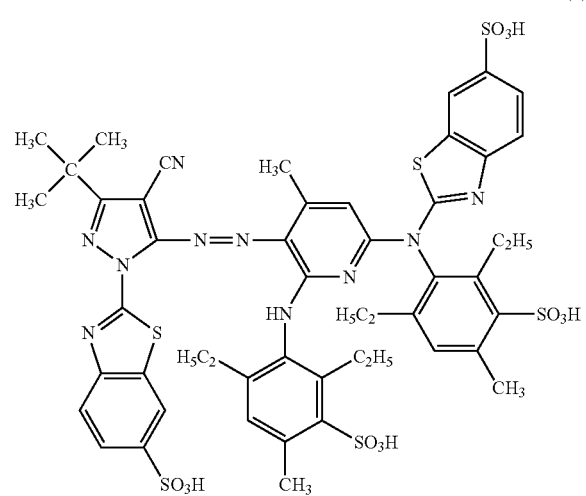

Formula (4)

The structure of the present invention can be suitably used in an ink set in which an ink containing a dye having high hydrophobicity like the compound (2), (3), or M1 and an ink containing a conventional water-soluble dye are combined.

Examples of the cyan dye may include:
(1) acid dyes such as C.I. Acid Blue 9, 22, 40, 59, 93, 102, 104, 113, 117, 120, 167, 229, 234, and 254; and
(2) direct dyes such as C.I. Direct Blue 6, 22, 25, 71, 78, 86, 90, 106, and 199.

Examples of the black dye may include:
(1) acid dyes such as C.I. Acid Black 2, 48, 51, 52, 110, 115, and 156;
(2) direct dyes such as C.I. Direct Black 17, 19, 22, 31, 32, 51, 62, 71, 74, 112, 113, 154, and 168;
(3) reactive dyes such as C.I. Reactive Black 1, 8, 12, and 13; and
(4) edible dyes such as C.I. Food Black 1 and 2.

A dye disclosed in Japanese Patent Application Laid-Open No. H06-25573, EP 0468647 A1, EP 0468648 A1, EP 0468649 A1, or the like may also be used in addition to those dyes.

The content of the dye is not particularly limited. The content has only to be appropriately determined depending on, for example, the kind of the dye, the composition of an aqueous medium, and characteristics which an ink is required to have. However, the dye is preferably incorporated at a content of from 1 mass % or more to 10 mass % or less with respect to the total mass of the ink. Setting the content to 1 mass % or more can provide an image having a sufficient optical density. Meanwhile, setting the content to 10 mass % or less can suppress the sticking of the ink to a nozzle or the like, and can improve the ejection stability of the ink through a reduction in viscosity. In order that the effects may be obtained with additional reliability, the dye is more preferably incorporated at a content of from 1 mass % or more to 5 mass % or less with respect to the entirety of the ink. It should be noted that the ink may contain only one kind of dye or may contain a plurality of dyes.

(1-2) Surfactant

In the ink set of the present invention, when there is a large difference in degree of hydrophobicity between the dye D1 as a constituent component of the ink (I) and the dye D2 as a constituent component of the ink (II) as described in the foregoing, the ethylene oxide average addition numbers of the acetylene glycol-based surfactants to be added to the ink (I) and the ink (II) are caused to differ from each other. Thus, the viscosities, surface tensions, wettabilities, and the like of the respective inks constituting the ink set can be adjusted to the same levels, and hence a difference between the ejection characteristics of the respective inks can be reduced. Such method is effective because the method can uniformize the viscosities, surface tensions, wettabilities, and the like of the respective inks without increasing or reducing the addition amounts of the surfactants.

With regard to the ethylene oxide average addition numbers of the acetylene glycol-based surfactants, the ethylene oxide average addition number S1 of the compound C1 incorporated into the ink (I) and the ethylene oxide average addition number S2 of the compound C2 incorporated into the ink (II) are set to satisfy a relationship of $2 \leq S2-S1 \leq 7$.

That is, the ethylene oxide average addition numbers of acetylene glycol of the compound C1 as a constituent component of the ink (I) and the compound C2 as a constituent component of the ink (II) are caused to differ from each other by from 2 or more to 7 or less. Setting the difference between the ethylene oxide average addition numbers to 2 or more can adjust the viscosities, surface tensions, wettabilities, and the like of the ink (I) and the ink (II) to the same levels, and hence can reduce a difference between the ejection characteristics of the ink (I) and the ink (II). Setting the difference between the ethylene oxide average addition numbers to 7 or less facilitates the uniformization of the solubilities of the compounds in water, and hence facilitates their adjustment through formulation.

A compound (1) represented by the following general formula (1) (2,4,7,9-tetramethyl-5-decyne-4,7-diol, or an ethylene oxide average adduct thereof) is used as each of the acetylene glycol-based surfactants. The use of the compound can improve the wettability of an ink and can improve the ejection stability of the ink.

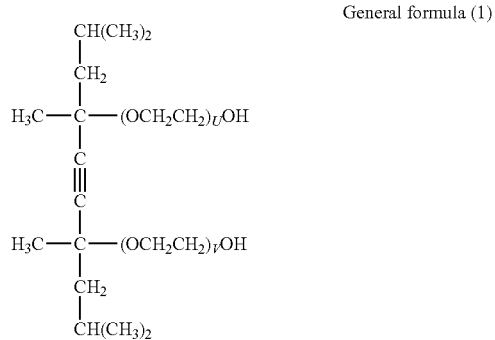

General formula (1)

(In the formula, U and V each represent the average addition number of moles of ethylene oxide.)

The term "average addition number of moles of ethylene oxide" refers to the average number of moles of ethylene oxide added per molecule of acetylene glycol. When description is made by taking the compound (1) as an example, the term means the average of U+V. The U+V of each of the compound C1 and the compound C2 is not particularly limited. However, the U+V is preferably from 0 or more to 10 or less, and the U+V is more preferably from 4 or more to 10 or less. When the average addition number of moles of ethylene oxide of the compound (1) is 0 or more, the compound has some degree of hydrophilicity, and hence the surface tension of an ink can be increased and the ejection stability of the ink can be improved. When the average addition number of moles of ethylene oxide of the compound (1) is 10 or less, the compound maintains some degree of hydrophobicity, and hence the wettability of the ink with respect to a nozzle wall constituted of, for example, an epoxy-based photosensitive resin can be improved. Therefore, the performance by which the ink is supplied to a nozzle improves and the ejection stability of the ink improves.

The compound (1) having an average of U+V of from or more to 10 or less is exemplified by the following commercial products: "Surfynol 420" (having an average of U+V of 2) and "Surfynol 440" (having an average of U+V of 3) manufactured by Air Products and Chemicals, Inc.; and "Acetylenol E00" (having an average of U+V of 0), "Acetylenol E40" (having an average of U+V of 4), "Acetylenol E60" (having an average of U+V of 6), "Acetylenol E81" (having an average of U+V of 8), and "Acetylenol E100" (having an average of U+V of 10) manufactured by Kawaken Fine Chemicals Co., Ltd. A combination of products having a difference in ethylene oxide average addition number of from 2 or more to 7 or less may be appropriately selected from those commercial products.

It should be noted that the term "compound C1" or "compound C2" as used in the present invention includes a mixture of the compounds (1) as well. That is, such a product that two or more kinds of the compounds (1) having different averages of U+V are mixed to adjust the average of U+V is also included in the term "compound C1" or "compound C2" as used in the present invention. For example, such a product that the compound (1) having an average of U+V of 6 and the compound (1) having an average of U+V of 8 are mixed at a mass ratio of 1:1 to set the average of U+V of the entire mixture to 7 is also included in the term "compound C1" or "compound C2."

Each acetylene glycol-based surfactant is preferably incorporated at a content of 1 mass % or less with respect to the total mass of an ink. Setting the content to 1 mass % or less suppresses an increase in viscosity of the ink due to excessive addition, provides the ink with an appropriate surface tension, and improves the ejection stability of the ink. In order that the effect may be obtained with additional reliability, the content is set to more preferably 0.5 mass % or less, particularly preferably 0.3 mass % or less. A lower limit for the content of the acetylene glycol-based surfactant is not particularly limited. However, the acetylene glycol-based surfactant is preferably incorporated at a content of 0.1 mass % or more with respect to the total mass of the ink in order that an effect of adding the surfactant may be obtained.

(1-3) Water

Deionized water (ion-exchanged water) is preferably used as the water. The content of the water is not particularly limited. However, the content is preferably from 30 mass % or more to 90 mass % or less, more preferably from 40 mass % or more to 85 mass % or less, particularly preferably from 60 mass % or more to 80 mass % or less with respect to the total mass of an ink. Setting the content to 30 mass % or more can hydrate the dye and a water-soluble compound, and can prevent the agglomeration of the dye and the water-soluble compound. Meanwhile, setting the content to 90 mass % or less can maintain the dissolved state of the dye even when the amount of a water-soluble organic compound relatively increases and hence a volatile component in the aqueous medium (such as water) volatilizes, and hence can prevent the precipitation and solidification of the dye.

(1-4) Water-Soluble Compound

In the ink set of the present invention, it is preferred that: the ink (I) and the ink (II) each further contain a water-soluble compound; and the water-soluble compound be at least one kind selected from the group consisting of a water-soluble organic solvent and a water-soluble compound that is solid at 25° C.

The term "water-soluble compound" as used herein means a compound that is freely miscible with water or has a solubility (25° C.) in water of 20 g/100 g or more. The water-soluble compound is at least one kind selected from the group consisting of a water-soluble organic solvent and a water-soluble compound that is solid at 25° C. The incorporation of the water-soluble compound can prevent the evaporation of the water and hence can prevent the sticking of an ink due to drying.

The kind of the water-soluble compound is not particularly limited. However, the water-soluble compound preferably has such property as to dissolve a dye. For example, various water-soluble organic solvents including such alcohols, polyhydric alcohols, glycol ethers, carboxylic acid amides, heterocycles, ketones, and alkanolamines as listed below can each be used. A water-soluble compound that is solid at 25° C. such as urea, ethylene urea, or trimethylolpropane can also be used.

(1) Alcohol

A linear alcohol having 1 to 5 carbon atoms such as methanol, ethanol, n-propyl alcohol, isopropyl alcohol, n-butyl alcohol, sec-butyl alcohol, isobutyl alcohol, tert-butyl alcohol, or n-pentyl alcohol.

(2) Polyhydric Alcohol

An alkanediol such as ethylene glycol (ethanediol), propanediol (1,2- or 1,3-propanediol), butanediol (1,2-, 1,3-, or 1,4-butanediol), 1,5-pentanediol, or 1,2-hexanediol.

A condensed product of an alkanediol such as diethylene glycol, triethylene glycol, tetraethylene glycol, dipropylene glycol, tripropylene glycol, polyethylene glycol, or polypropylene glycol.

A polyhydric alcohol other than an alkanediol such as glycerin, trimethylolpropane, 1,2,6-hexanetriol, or thiodiglycol.

(3) Glycol Ether

A monomethyl ether of ethylene glycol.

A monomethyl ether or monoethyl ether of diethylene glycol.

A monomethyl ether, monoethyl ether, monobutyl ether, dimethyl ether, or diethyl ether of triethylene glycol.

A dimethyl ether or diethyl ether of tetraethylene glycol.

(4) Carboxylic Acid Amide

N,N-Dimethylformamide or N,N-dimethylacetamide.

(5) Heterocycle

A cyclic ether such as tetrahydrofuran or dioxane.

A nitrogen-containing heterocycle such as 2-pyrrolidone, N-methyl-2-pyrrolidone, or N-methyl morpholine.

A sulfur-containing heterocycle such as sulfolane.

(6) Urea

A urea such as urea, ethyleneurea, or 1,3-dimethyl-2-imidazolidinone (N,N'-dimethylethyleneurea).

(7) Ketone

A ketone such as acetone or methyl ethyl ketone.

A ketoalcohol such as 4-hydroxy-4-methyl-2-pentanone (diacetone alcohol).

(8) Alkanolamine

A monoethanolamine, diethanolamine, or triethanolamine.

(9) Other

A sulfur-containing compound such as dimethyl sulfoxide or bis(hydroxyethyl) sulfone.

Of the water-soluble organic solvents, polyhydric alcohols are preferred and glycerin is more preferred. Glycerin is preferred because glycerin hardly volatilizes and exhibits an excellent preventing effect on the sticking of an ink. In addition, one kind of the water-soluble organic solvents may be used alone, or two or more kinds thereof may be used as a mixture. For example, glycerin, and a polyhydric alcohol except glycerin and a nitrogen-containing heterocycle are preferably used in combination. At this time, triethylene glycol or the like can be used as the polyhydric alcohol except glycerin and 2-pyrrolidone or the like can be used as the nitrogen-containing heterocycle. Such mixed solvent is preferred because the mixed solvent exhibits a high preventing effect on the thickening of the ink.

The content of the water-soluble compound is not particularly limited. However, the content is set to preferably 10 mass % or more, more preferably 15 mass % or more with respect to the total mass of an ink in order that preventing effects on the evaporation of the aqueous medium and on the sticking of the ink due to drying may be obtained. Meanwhile, the content is set to preferably 40 mass % or less, more preferably 30 mass % or less with respect to the total mass of the ink from the viewpoints of allowing the ink to correspond to a high drive frequency and preventing the occurrence of mildew.

Urea, ethylene urea, or the like is preferably used as the water-soluble compound that is solid at 25° C., and ethylene urea is more preferably used as the compound. The content of the water-soluble compound that is solid at 25° C. is not particularly limited. However, the content is set to preferably 5 mass % or more, more preferably 9 mass % or more with respect to the total mass of an ink in order that preventing effects on the evaporation of the aqueous medium and on the sticking of the ink due to drying may be obtained. Meanwhile, the content is set to preferably 30 mass % or less, more preferably 15 mass % or less with respect to the total mass of the ink for preventing inconvenience due to excessive addition.

(1-6) Other Additive

The ink may contain an additive other than the surfactant depending purposes. Examples of such additive may include a pH adjustor, a rust inhibitor, an antiseptic, a mildewproofing agent, an antioxidant, a reduction inhibitor, and a salt.

(1-7) Viscosity

In the ink set of the present invention, each of a viscosity $\eta 1$ of the ink (I) and a viscosity $\eta 2$ of the ink (II) is preferably from 1.5 mPa·s or more to 5.0 mPa·s or less. Setting the viscosity to 1.5 mPa·s or more can result in the formation of a good ink droplet. Meanwhile, setting the viscosity to 5.0 mPa·s or less improves the flowability of the ink, and hence improves the property by which the ink is supplied to a nozzle, and by extension, the ejection stability of the ink. In order that the effects may be exhibited with additional reliability, each viscosity is preferably set to from 1.6 mPa·s or more to 3.5 mPa·s or less. Further, each viscosity is more preferably set to from 1.7 mPa·s or more to 2.5 mPa·s or less.

In addition, a difference between the viscosity $\eta 1$ of the ink (I) and the viscosity $\eta 2$ of the ink (II) is preferably 0.3 mPa·s or less. Setting the difference between the viscosities to 0.3 mPa·s or less can uniformize the ejection characteristics of the ink (I) and the ink (II), and hence can improve the printing quality of an image.

In order that the ejection characteristics of all inks constituting the ink set may be uniformized, each of viscosities $\eta$ of the plurality of kinds of inks constituting the ink set is preferably from 1.5 mPa·s or more to 5.0 mPa·s or less, more preferably from 1.6 mPa·s or more to 3.5 mPa·s or less, particularly preferably from 1.7 mPa·s or more to 2.5 mPa·s or less. In addition, a difference between the viscosities of any two inks selected from the plurality of kinds of inks is preferably 0.3 mPa·s or less.

The viscosity of the ink means a value measured with an E-type viscometer (for example, "RE-80L viscometer" manufactured by Toki Sangyo Co., Ltd.) under the condition of a temperature of 25° C. according to JIS Z 8803. The viscosity of the ink can be adjusted by, for example, the kind and amount of the surfactant and the kind and amount of the water-soluble organic solvent.

(1-8) Surface Tension

In the ink set of the present invention, each of a surface tension $\gamma 1$ of the ink (I) and a surface tension $\gamma 2$ of the ink (II) is preferably from 25 mN/m or more to 45 mN/m or less, more preferably from 25 mN/m or more to 35 mN/m or less. Setting each surface tension to 25 mN/m or more can maintain the meniscus of an ink ejection orifice and hence can prevent such inconvenience that the ink flows out of the ink ejection orifice. Setting each surface tension to 45 mN/m or less can prevent such inconvenience that fixation becomes insufficient owing to a reduction in ejection characteristic or a reduction in velocity at which the ink penetrates a recording medium.

In addition, a difference between the surface tension γ1 of the ink (I) and the surface tension γ2 of the ink (II) is preferably 3.5 mN/m or less, more preferably 3.0 mN/m or less. Setting the difference between the surface tensions to 3.5 mN/m or less can uniformize the ejection characteristics of the ink (I) and the ink (II), and hence can improve the printing quality of an image.

In order that the ejection characteristics of all inks constituting the ink set may be uniformized, each of surface tensions γ of the plurality of kinds of inks constituting the ink set is preferably from 25 mN/m or more to 45 mN/m or less. In addition, a difference between the surface tensions of any two inks selected from the plurality of kinds of inks is preferably 3.5 mN/m or less, more preferably 3.0 mN/m or less.

The surface tension of the ink means a value measured by a plate method using a platinum plate with an automatic surface tensiometer (for example, "CBVP-Z type" manufactured by Kyowa Interface Science Co., LTD.) under the conditions of a temperature of 25° C. and a humidity of 50%. The surface tension of the ink can be adjusted by, for example, the addition amount of the surfactant, and the kind and content of the water-soluble organic solvent.

(1-9) pH

The pH of each ink constituting the ink set of the present invention is preferably from 6.5 or more to 10.0 or less, more preferably from 7.0 or more to 8.5 or less. Setting the pH to less than 6.5 may cause such inconvenience that the solubility of the dye deteriorates. Setting the pH to 6.5 or more can prevent such inconvenience. On the other hand, a pH in excess of 10.0 is not preferred because of the following reason. The pH of the ink is so high that some member of an apparatus to be used is subjected to a chemical attack through contact with the ink, which leads to the elution of an organic matter or inorganic matter in the ink. This may result in such an inconvenience that an ejection failure occurs. By setting the pH to 10.0 or less, such inconvenience may be prevented.

(2) Recording Head

The recording head according to the present invention is a recording head for ink-jet recording in which a plurality of line type heads are in combination. In the following, the recording head according to an embodiment of the present invention is described with reference to the attached drawings. However, the recording head according to the present invention is not limited to a structure described below.

(2-1) Structure of Nozzle Portion

Figure 1B:
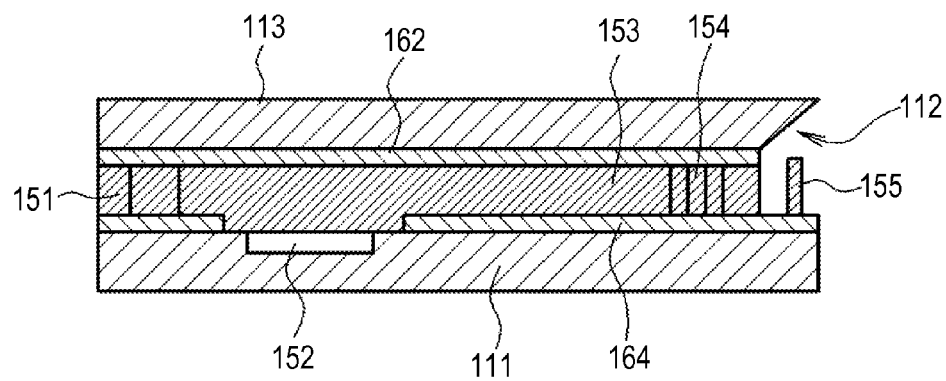
FIG. 1B is a side view schematically illustrating the internal structure of the nozzle illustrated in FIG. 1A.
Figure 1C:
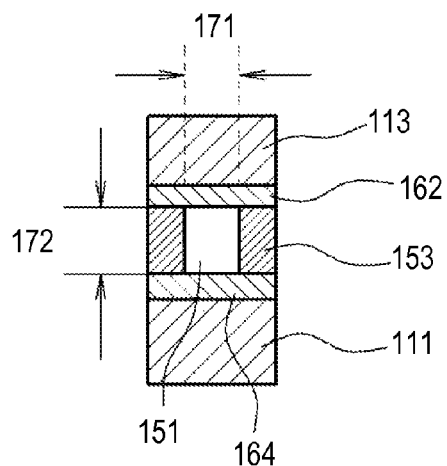
FIG. 1C is a front view schematically illustrating an ink ejection orifice of the nozzle illustrated in FIG. 1A.

First, a structure of a nozzle portion is described with reference to FIGS. 1A to 1C. FIG. 1A is a top view schematically illustrating an internal structure of nozzles of the recording head. FIG. 1B is a side view schematically illustrating the internal structure of the nozzle illustrated in FIG. 1A. FIG. 1C is a front view schematically illustrating an ink ejection orifice of the nozzle illustrated in FIG. 1A.

In the recording head of the thermal system, as illustrated in FIG. 1A, a nozzle array is formed of a plurality of nozzle flow paths 159 partitioned by nozzle walls 153, a plurality of ink ejection orifices 151 communicating with the nozzle flow paths 159 are formed, and a heater 152 for ink ejection is disposed in each of the nozzle flow paths 159. The head having such a structure can cause an ink droplet to fly from the ink ejection orifice 151 by heating ink filled into the nozzle flow path 159 with the heater 152 so as to generate a bubble in the ink.

In the illustrated embodiment, a nozzle filter 155 for trapping foreign matters floating in an ink flow path in the recording head is disposed between the nozzle flow paths 159 and a common liquid chamber 112. Further, a top board member 113 to which a nozzle top board 162 is bonded includes an ink supply opening (not shown) formed by anisotropic etching or the like so as to allow outside ink to be introduced from the common liquid chamber 112 to the nozzle flow paths 159.

Right and left side surfaces of each nozzle flow path 159 are partitioned by the nozzle walls 153. In addition, an upper surface side of the nozzle flow path 159 is partitioned by the nozzle top board 162, and a bottom surface side thereof is partitioned by a nozzle bottom board 164. That is, the nozzle flow path 159 is an inner space having a substantially quadrangular prism shape partitioned from a surrounding space with the nozzle walls 153, the nozzle top board 162, and the nozzle bottom board 164 being partition walls. The nozzle top board 162 is bonded to the top board member 113 formed of S1 or the like, and the nozzle bottom board 164 is bonded to a heater substrate 111.

The ink ejection orifice 151 is an opening portion for ejecting ink, which is formed at one end of the nozzle flow path 159, and communicates with the common liquid chamber 112 via the nozzle flow path 159. The ink ejection orifice 151 is formed on a face surface. In the illustrated example, the face surface is formed integrally with the nozzle walls 153, but may be formed by providing a face plate separately. The opening area of the ink ejection orifice 151 is set to from 100 $\mu m^2$ or more to 350 $\mu m^2$ or less. When the opening area is set to 100 $\mu m^2$ or more, the formation of a non-ejection nozzle can be prevented. On the other hand, when the opening area is set to 350 $\mu m^2$ or less, minute liquid droplets in which the amount of one ink droplet is 10 pL or less can be formed, and a resolution of 600 dpi or more can be achieved. Note that, the opening area is represented by a product of an ejection orifice width 171 and an ejection orifice height 172.

The recording head is a line type head, in which a plurality of nozzle flow paths form a nozzle array. The number of nozzle flow paths that form the nozzle array is not particularly limited. However, in order to exhibit the effects of the present invention, it is necessary that the total number of nozzles in the nozzle array be 1,200 or more. It is preferred that the total number of nozzles in the nozzle array be from 1,200 or more to 9,600 or less, and it is further preferred that the total number of nozzles in the nozzle array be from 1,200 or more to 4,800 or less. Further, it is necessary that the length of the nozzle array be 2 inches or more, and it is preferred that the length of the nozzle array be from 2 inches or more to 4 inches or less.

The heater 152 is a heating unit for generating bubbles in ink filled into the nozzle flow path 159 by heating. The heater 152 is disposed on the heater substrate 111. As the heater 152, a resistor (for example, a resistor made of tantalum nitride or the like) can be used. Electrodes (not shown) made of aluminum or the like for electric conduction are connected to the heater 152, and a switching transistor (not shown) for controlling the electric conduction to the heater 152 is connected to one of the electrodes. The drive of the switching transistor is controlled by an integrated circuit (IC) formed of a circuit such as a gate element for control, and the switching transistor is driven with a predetermined pattern by a signal from outside of the recording head.

The recording head can be driven with a drive frequency of from 1 kHz or more to 10 kHz or less. By driving the recording head with a drive frequency of 1 kHz or more, even when the amount of ink per droplet is extremely small, the amount of ink provided per unit time can be increased to increase the amount of image data and the number of recording dots. In other words, a high quality image can be printed at high speed. By driving the recording head with a drive frequency of 10 kHz or less, such an inconvenience is inhibited that the stability of ejection is reduced due to an insufficient supply amount of ink to the nozzle with respect to the amount of ejected ink in high speed printing as described above. In order to obtain the above-mentioned effects with more reliability, it is preferred that the recording head be driven with a drive frequency of from 3 kHz or more to 8 kHz or less. Further, it is also preferred that the recording head according to the present invention be driven with a drive frequency of from 6 kHz or more to 10 kHz or less, because the stability of ejection is less liable to be reduced and ejection failure of the nozzle is less liable to occur even with a high drive frequency.

It is preferred that the total length of the nozzle be set to from 200 μm or more to 300 μm or less. The "total length of the nozzle" in this case means the length of the nozzle flow path 159 and specifically means a length from an end on the ink ejection orifice 151 side to an end on the common liquid chamber 112 side of the nozzle wall 153 forming the nozzle flow path 159.

The nozzle flow path 159 is divided into a nozzle front portion 181, which is a portion from a heater center 157 to the end on the ink ejection orifice 151 side, and a nozzle back portion 182, which is a portion from the heater center 157 to the end on the common liquid chamber 112 side. From the viewpoint of an ejection speed, it is preferred that a flow resistance of the nozzle front portion 181 (front resistance) and a flow resistance of the nozzle back portion 182 (back resistance) satisfy such a relationship that a value of front resistance/back resistance is from 0.3 or more to 0.8 or less. Note that, the flow resistance can be determined by calculation according to the Hagen-Poiseuille law from values such as a flow path sectional area, flow path length, and viscosity of ink to be ejected. That is, when ink to be used (and its viscosity) is determined, the value of front resistance/back resistance can be adjusted by the flow path sectional area of a nozzle, flow path length, and the like.

(2-2) Nozzle Member

The nozzle wall 153, the nozzle top board 162, and the nozzle bottom board 164 partitioning the nozzle flow path 159 can each be formed of, for example, a photosensitive resin. As the photosensitive resin, a negative photoresist or the like may be used. Specific examples of a commercial product may include: "SU-8 Series" and "KMPR-1000" (manufactured by Kayaku Microchem); and "TMMR," "TMMR 52000," and "TMMF 52000" (manufactured by TOKYO OHKA KOGYO CO., LTD.). Of those, an epoxy-based photosensitive resin excellent in solvent resistance and strength as a nozzle wall is preferably used. A particularly preferred commercial product is specifically, for example, "TMMR 52000" manufactured by TOKYO OHKA KOGYO CO., LTD.

(2-3) Hydrophilic Region, Water-Repellent Region

The recording head of the present invention is preferably such that a hydrophilic region or a water-repellent region is formed on the peripheral edge of an ink ejection orifice. Which one of the hydrophilic region and the water-repellent region is formed has only to be determined in consideration of the kind of the coloring material of the ink to be used and the surface tension of the ink.

For example, when an ink whose coloring material is a pigment or whose surface tension is 34 mN/m or less is used, a recording head (hydrophilic head) in which a hydrophilic region is formed on the peripheral edge of an ink ejection orifice is preferred. In addition, a hydrophilic region having a contact angle with the ink to be used of 60° or less is preferably formed on the peripheral edge of the ink ejection orifice, and a hydrophilic region having a contact angle of 0° (that is, forming no contact angle) is more preferably formed. Note that, the contact angle of a hydrophilic region or a water-repellent region can be measured in conformity with JIS R 3257 with a contact angle meter (such as a product available under the trade name "SImage-mini" from Excimer Inc.) by an ATAN1/2θ method. Contact angles are measured by the method in Examples to be described later as well.

The hydrophilic region can be formed by a method involving forming a member (face member) in which an ink ejection orifice is formed through use of a hydrophilic material, a method involving subjecting the surface (face surface) of the face member to hydrophilic treatment, a method involving providing a hydrophilic film to the face surface, or the like.

As the face member, a resin such as an epoxy resin, in particular, an epoxy-based photosensitive resin can be used.

As the method involving subjecting a face surface to hydrophilic treatment, there may be given a method involving roughening a face surface. Examples of the surface roughening method may include laser irradiation, $UV/O_3$ treatment, plasma treatment, heat treatment, oxidation treatment, and embossing treatment. Lasers that may be used in the laser irradiation include an excimer laser, a YAG laser, a $CO_2$ laser, and the like. Further, a peripheral edge portion of an ink ejection orifice may also be treated by a method involving soaking the peripheral edge portion in a liquid having high hydrophilicity for a long period of time. As the "liquid having high hydrophilicity", there may be given pigment ink and the like. For example, it is appropriate that a face member be soaked in pigment ink in use for 10 minutes or more.

As the method involving providing a hydrophilic film to a face surface, there may be given a method involving forming a metal film or a hydrophilic resin film on a face surface. Needless to say, the hydrophilic film has hydrophilicity, and the hydrophilic film is preferably formed of a material having satisfactory adhesiveness with respect to a face member. As such material, there may be given a composition containing a water-soluble resin and a water-insoluble low molecular weight compound. For example, the hydrophilic film can be formed by dissolving a water-soluble resin (hydroxypropyl cellulose, etc.) and a water-insoluble low molecular weight compound (bisphenol A, etc.) in an appropriate solvent (dimethylformamide, etc.), applying the obtained solution to a face surface, drying the solution, and treating the dried solution with an alcohol or the like as needed.

It is appropriate that the method of forming a hydrophilic region be selected from among the above-mentioned methods as appropriate depending on the material forming a face member. Further, the hydrophilic region may be formed by a combination of two or more kinds of the above-mentioned methods. Of the above-mentioned methods, preferred is a method involving forming a nozzle peripheral portion through use of an epoxy-based photosensitive resin, treating the nozzle peripheral portion with $UV/O_3$, and subjecting the nozzle peripheral portion to hydrophilic treatment by soaking the nozzle peripheral portion in pigment ink.

In addition, for example, when an ink whose coloring material is a dye and whose surface tension is more than 34 mN/m is used, a recording head (water-repellent head) in which a water-repellent region is formed on the peripheral edge of an ink ejection orifice is preferred. In addition, a water-repellent region having a contact angle with the ink to be used of 90° or more is more preferably formed on the peripheral edge of the ink ejection orifice, and a water-repellent region having a contact angle with the ink to be used of 100° or more is particularly preferably formed.

The water-repellent region can be formed by, for example, a method involving applying a water-repellent film to the surface (face surface) of a member (face member) having formed therein an ink ejection orifice.

The method involving applying the water-repellent film to the face surface can be, for example, a method involving forming an ultra-water-repellent resin film on the face surface. The ultra-water-repellent resin film can be formed by a conventionally known method. Examples thereof may include: a method involving applying a fluorine resin, a silicone resin, or the like to the face surface to form a resin film; and a method involving subjecting a fluorine-based monomer to plasma polymerization on the face surface to form a fluorine resin film. A method involving forming a water/oil-repellent resin film on the face surface may also be adopted. An example of the method may be a method involving forming a film formed of a fluorine resin obtained by polymerizing a fluorocarbon compound. In particular, the following method is preferred: a solution is prepared by dissolving a fluorine-containing silicone coupling agent (such as "KP-801M" manufactured by Shin-Etsu Chemical Co., Ltd.) in a fluorine-based solvent (such as "CXT-809A" manufactured by ASAHI GLASS CO., LTD., or "<Novec> HFE-7100," "<Novec> HFE-7200," or "<Novec> HFE-71IPA" manufactured by Sumitomo 3M Limited), and the solution is deposited from the vapor onto the face surface under heat to form a water-repellent film.

(2-4) Entire Structure of Recording Head

Figure 2A:
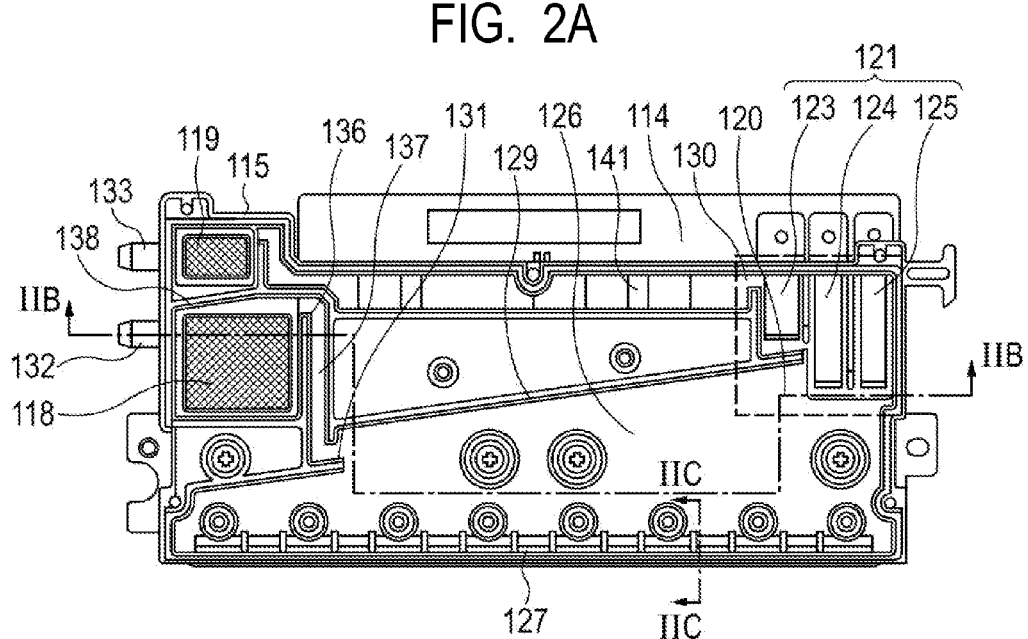
FIG. 2A is a front view schematically illustrating a recording head according to the present invention.
Figure 2B:
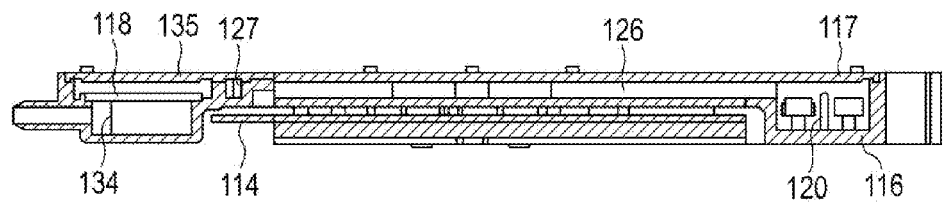
FIG. 2B is a sectional view illustrating the recording head taken along the line IIB-IIB of FIG. 2A.
Figure 2C:
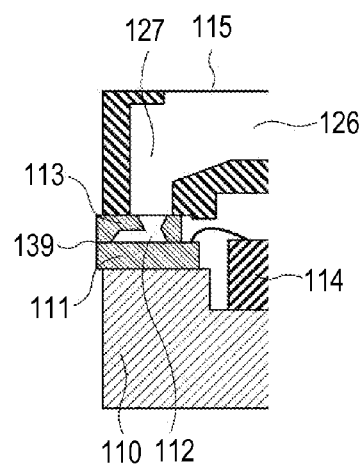
FIG. 2C is a sectional view illustrating the recording head taken along the line IIC-IIC of FIG. 2A.

Next, an entire structure of the recording head is described with reference to FIGS. 2A to 2C. The recording head having a structure as illustrated in FIGS. 2A to 2C is disclosed in Japanese Patent Application Laid-Open No. 2013-014111. Therefore, the disclosure of Japanese Patent Application Laid-Open No. 2013-014111 is incorporated herein and only a brief description thereof is made. FIG. 2A is a front view schematically illustrating the recording head according to the present invention. FIG. 2B is a sectional view taken along the line IIB-IIB of FIG. 2A. FIG. 2C is a sectional view taken along the line IIC-IIC of FIG. 2A. For the sake of convenience of description, a liquid supply case cover is omitted in the front view.

As illustrated in FIGS. 2A to 2C, it is preferred that the recording head according to the present invention being a line type head include the common liquid chamber 112 communicating with the plurality of nozzle flow paths that form the nozzle array, a liquid supply port 127 communicating with the common liquid chamber 112, a main liquid supply chamber 126 communicating with the liquid supply port 127, a liquid supply path 137 communicating with the main liquid supply chamber 126, a liquid supply chamber (first liquid supply chamber 134 and second liquid supply chamber 135) communicating with the liquid supply path 137, a supply filter 118 provided so as to partition the liquid supply chamber into the first liquid supply chamber 134 and the second liquid supply chamber 135 from an upstream side along a flow during liquid supply, a gas-liquid separation portion 120 provided in part of the main liquid supply chamber 126, and an air chamber 141 communicating with the gas-liquid separation portion 120.

Further, it is preferred that the nozzle flow paths, the common liquid chamber 112, the liquid supply port 127, the main liquid supply chamber 126, the liquid supply path 137, the liquid supply chamber (the first liquid supply chamber 134 and the second liquid supply chamber 135), the supply filter 118, the gas-liquid separation portion 120, and the air chamber 141 be disposed on a plane parallel to a plane including an arrangement direction of the nozzle flow paths and an ejection direction of the liquid, and the main liquid supply chamber 126, the liquid supply path 137, the supply filter 118, the gas-liquid separation portion 120, and the air chamber 141 be disposed without being laminated respectively.

The recording head having the structure as illustrated in FIGS. 2A to 2C is referred to as a recording head of a gas-liquid separation type. The recording head of the gas-liquid separation type fills ink in a nozzle thereof using self weight of the ink, and thus, it is extremely difficult to secure the stability of ejection compared with a recording head of a related-art structure. Therefore, it can be said that the recording head of the gas-liquid separation type is an embodiment that can most enjoy the effects of the present invention.

A base plate 110 made of ceramic supports the heater substrate 111 made of silicon. On the heater substrate 111, a plurality of electrothermal converters (heaters or energy generation portions) serving as ejection energy generation elements for a liquid and a plurality of flow path walls for forming nozzles corresponding to the electrothermal converters are formed. Further, a liquid chamber frame surrounding the common liquid chamber 112 communicating with each nozzle is also formed on the heater substrate 111. The top board member 113 forming the common liquid chamber 112 is joined onto a side wall of the nozzle and the liquid chamber frame thus formed. Thus, the heater substrate 111 and the top board member 113 are laminated so as to adhere to the base plate 110 under the condition of being integrated with each other. Such lamination and adhesion are performed with an adhesive having a satisfactory heat conductivity such as silver paste. In a back portion of the heater substrate 111 on the base plate 110, a mounted printed circuit board (PCB) 114 is supported through use of a double-sided tape (not shown). Each ejection energy generation element on the heater substrate 111 and the PCB 114 are electrically connected to each other by wire bonding corresponding to each wiring.

A liquid supply member 115 is joined onto an upper surface of the top board member 113. The liquid supply member 115 is formed of a liquid supply case 116 and a liquid supply case cover 117. When the liquid supply case cover 117 closes the upper surface of the liquid supply case 116, a liquid chamber and a liquid supply path to be described later are formed. The liquid supply case 116 and the liquid supply case cover 117 are joined to each other through use of, for example, a thermosetting adhesive. Further, the liquid supply case 116 is provided with the supply filter 118 and a discharge filter 119. The supply filter 118 serves to remove foreign matters in a liquid supplied to the liquid supply member 115, and the discharge filter 119 serves to prevent foreign matters from entering from outside of the recording head. Each filter is fixed to the liquid supply case 116 by heat fusion. Further, the gas-liquid separation portion 120 is formed in part of the liquid supply case 116, and a liquid surface detection sensor 121 is mounted from outside so as to protrude to the gas-liquid separation portion 120. Thus, the amount of a liquid in the liquid chamber is controlled as described above.

Now, the structure of the liquid chamber, the liquid supply path, and the like formed by fitting of two components the liquid supply case 116 and the liquid supply case cover 117 is described. In a joining surface of the liquid supply case 116 with respect to the top board member 113, the liquid supply port 127 being a rectangular opening portion is formed substantially in parallel to an arrangement direction of nozzles over the width of the nozzle array, and the main liquid supply chamber 126 in a reservoir chamber shape is formed in an extended portion of the liquid supply port 127. That is, the main liquid supply chamber 126 is formed substantially in parallel to the nozzle array over the width of the nozzle array. Further, a top surface on an opposed side of the liquid supply port 127 forms an inclination with the gas-liquid separation portion 120 being an uppermost portion (main liquid supply chamber inclination 129) substantially over the entire region. The main liquid supply chamber inclination 129 has two opening portions, one of which is a liquid communication portion 131 and the other of which is the gas-liquid separation portion 120.

The gas-liquid separation portion 120 forms part of the main liquid supply chamber 126, and the depth of the part formed of the gas-liquid separation portion 120 is larger than that of the other part of the main liquid supply chamber 126. The purpose of this structure is to enhance the effect of breaking air bubbles mixed in a liquid in the liquid chamber as described later. In the embodiment illustrated in FIG. 2A, three electrodes of stainless steel are mounted in the gas-liquid separation portion 120, and the electrodes are an upper limit detection electrode 123, a ground electrode 124, and a lower limit detection electrode 125 arranged in the order from the left side of FIG. 2A. The liquid surface in the main liquid supply chamber 126 is kept between the upper limit and the lower limit by the electric conduction between the ground electrode 124 and the upper limit detection electrode 123 and the electric conduction between the ground electrode 124 and the lower limit detection electrode 125. In the ink-jet head of the embodiment illustrated in FIG. 2A, the reliability of detection can be enhanced by detecting the liquid surface of a liquid subjected to gas-liquid separation.

An air communication portion 130 is disposed on an extended portion of the gas-liquid separation portion 120, and the air chamber 141 serving as an air flow path is formed in a further extended portion. The discharge filter 119 described above is provided in a still further extended portion and communicates with a discharge joint 133. The discharge filter 119 is formed of a material having water repellency. Even when a liquid flows into the air flow path (air chamber 141) and ink sticks to the discharge filter 119 to form a meniscus of the ink in the discharge filter 119, the capillary force of a filter portion can be reduced by the water repellency and the ink can be removed easily.

On the other hand, the liquid supply path 137 is provided through intermediation of the liquid communication portion 131 provided at the main liquid supply chamber inclination 129. The liquid supply path 137 forms a tubular shape from the liquid communication portion 131 to the vicinity of the supply filter 118 and is formed on a plane that is substantially identical and parallel to that of the main liquid supply chamber 126. The supply filter 118 is also disposed on a plane that is substantially identical and parallel to that of the main liquid supply chamber 126. The supply filter 118 is provided so as to partition the liquid supply chamber into two chambers. The chamber on a side communicating with a supply joint 132, that is, the chamber on an upstream side along a flow of liquid supply in the recording head is defined as the first liquid supply chamber 134, and the chamber on a downstream side is defined as the second liquid supply chamber 135. The supply filter 118 is disposed on a plane that is substantially identical and parallel to that of the main liquid supply chamber 126, and hence the first liquid supply chamber 134 and the second liquid supply chamber 135 adjacent to both surfaces of the supply filter 118 are also disposed on a plane that is substantially parallel to that of the main liquid supply chamber 126 and an ink ejection orifice arrangement surface 139.

The second liquid supply chamber 135 has an opening (hereinafter referred to as "second liquid supply chamber opening 136") above the supply filter 118 and communicates with the liquid supply path 137 through the second liquid supply chamber opening 136. Further, a top surface of the second liquid supply chamber 135 is provided with an inclination (hereinafter referred to as "second liquid supply chamber inclination 138") with the second liquid supply chamber opening 136 being an uppermost portion.

As described above, the main liquid supply chamber 126, the gas-liquid separation portion 120, the liquid supply path 137, the supply filter 118, the first liquid supply chamber 134, and the second liquid supply chamber 135 are each provided on a plane that is substantially parallel to the ink ejection orifice arrangement surface 139. On the other hand, as illustrated in the cross-section taken along line IIB-IIB, it is important that the main liquid supply chamber 126, the liquid supply path 137, the supply filter 118, and the gas-liquid separation portion 120 be disposed so as not to overlap each other in a direction perpendicular to the plane.

It is preferred that the supply filter 118 be a mesh made of stainless steel having a filter pore diameter of from 1 µm or more to 10 µm or less and a filter area of from 10 mm² or more to 500 mm² or less. The supply filter 118 having a filter pore diameter of 1 µm or more and a filter area of 10 mm² or more can reduce a flow path resistance (pressure loss) and can facilitate movement of an air bubble in the recording head. In order to obtain the above-mentioned effects with more reliability, it is further preferred that the filter area be 200 mm² or more. On the other hand, the supply filter 118 having a filter pore diameter of 10 µm or less can prevent dust from flowing into the nozzle without fail, and the supply filter 118 having a filter area of 500 mm² or less can downsize the recording head. In order to obtain the above-mentioned effects with more reliability, it is further preferred that the filter pore diameter be from 3 µm or more to 8 µm or less.

(2-5) Filling of Ink

In the recording head according to the present invention, ink-jet recording ink is filled in the inner space of the line type head, which communicates with the ink ejection orifices. It is preferred that the ink be filled at least at a portion of the inner space from ink ejection orifices to the common liquid chamber (that is, the nozzle flow paths and the common liquid chamber).

As described above, the recording head according to the present invention is a combination of a plurality of line type heads. Only one color of ink is filled in one line type head. By filling the plurality of line type heads with ink of different hues, respectively, an ink set of a combination of a plurality of colors of ink is formed in the recording head. The recording head according to the present invention uses, as the ink set, an ink set according to the present invention.

(3) Ink-Jet Recording Apparatus

The ink-jet recording apparatus according to the present invention includes a recording head for ink-jet recording and an ink storage portion for storing ink to be supplied to the recording head, and has a feature in that the recording head is the recording head according to the present invention, and a plurality of the ink storage portions are provided so as to correspond to the plurality of line type heads, respectively. The form of the ink storage portion is not particularly limited. For example, the ink storage portion may be an ink tank as illustrated in FIG. 3.

(3-1) Ink Tank

Figure 3:
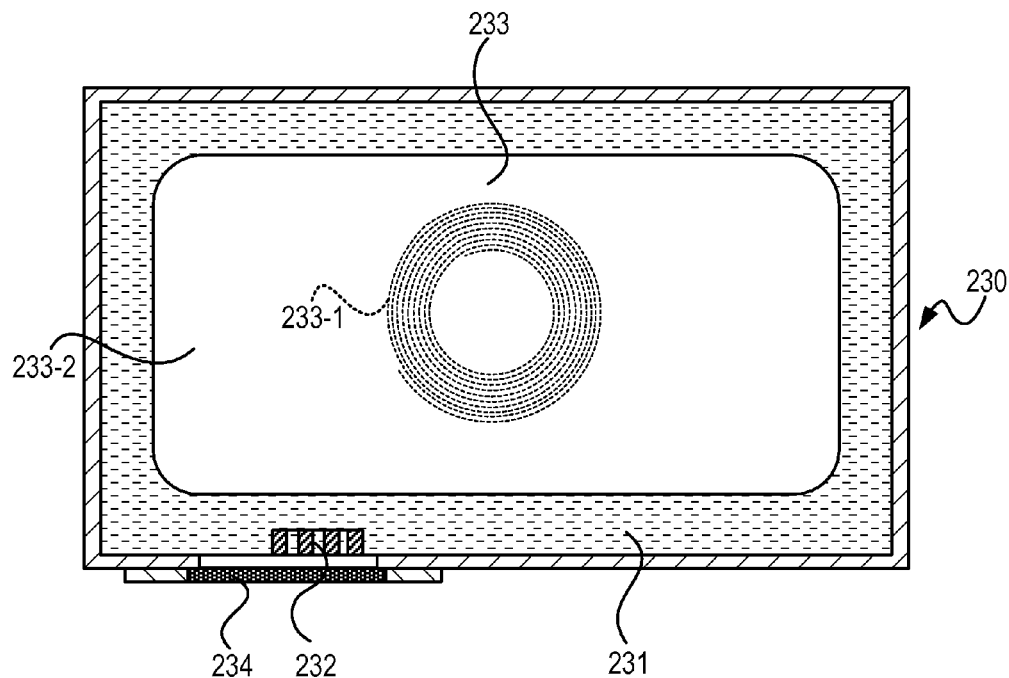
FIG. 3 is an enlarged sectional view illustrating an ink tank.

FIG. 3 is an enlarged sectional view illustrating the ink tank. An ink tank 230 is a container for storing liquid, and a liquid chamber (ink chamber 231) for storing ink is formed therein. The ink chamber 231 has closed space formed therein, which can communicate with the outside only via a joint portion 232. The ink tank 230 is formed so as to be removable from the recording head. Further, the ink tank 230 is provided above the recording head. The ink chamber 231 is formed of a flexible member, and has built therein a spring 233-1 for generating negative pressure and a pressure plate 233-2 coupled to the spring 233-1. The spring 233-1 urges the ink chamber 231 via the pressure plate 233-2 from the inside to the outside to enlarge inner space of the ink chamber 231. In other words, the spring 233-1 generates predetermined negative pressure in the ink chamber 231, and the spring 233-1, the pressure plate 233-2, and the ink chamber 231 are integral with one another to form a negative pressure generation portion 233. The joint portion 232 is provided with a filter 234 made of a nonwoven fabric.

Figure 4:
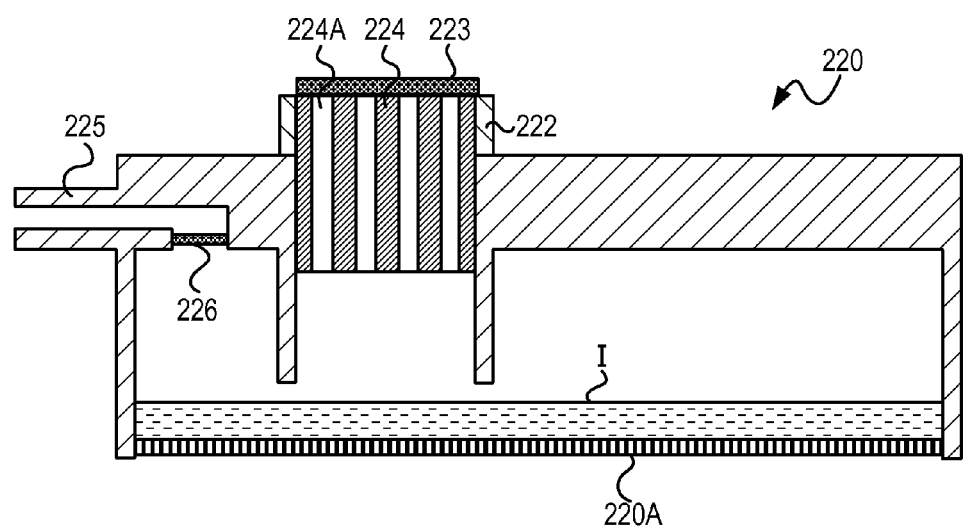
FIG. 4 is an enlarged sectional view of the recording head.

FIG. 4 is an enlarged sectional view of the recording head. A recording head 220 includes an energy generation element (not shown) such as an electrothermal conversion element (heater for ink ejection). The energy generation element causes ink I in an ink chamber 221 (liquid in the liquid chamber) to be ejected from an ejection orifice 220A. In the ink chamber 221, air (gas) exists together with the ink I. Therefore, an ink storage portion (liquid storage portion) having the ink I stored therein and an air storage portion (gas storage portion) having air (gas) stored therein are formed in the ink chamber 221.

An ink supply portion 222 for communicating the ink chamber 221 with the ink chamber 231 of the ink tank is provided above the ink chamber 221. An average width of the ink supply portion 222 is about 10 mm. Further, a filter member 223 is provided in an opening portion of the ink supply portion 222. The illustrated filter member 223 is a mesh formed of SUS. Metal fibers are woven into the mesh. A fine mesh of the filter member 223 suppresses entry of dust into the recording head from the outside.

Figure 5A:
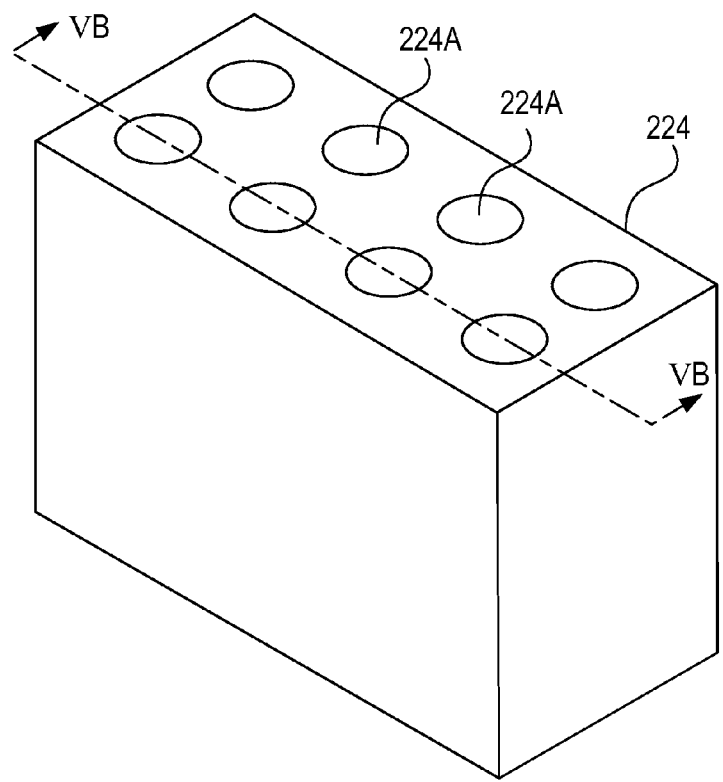
FIG. 5A is an enlarged perspective view illustrating an ink retaining member illustrated in FIG. 4.
Figure 5B:
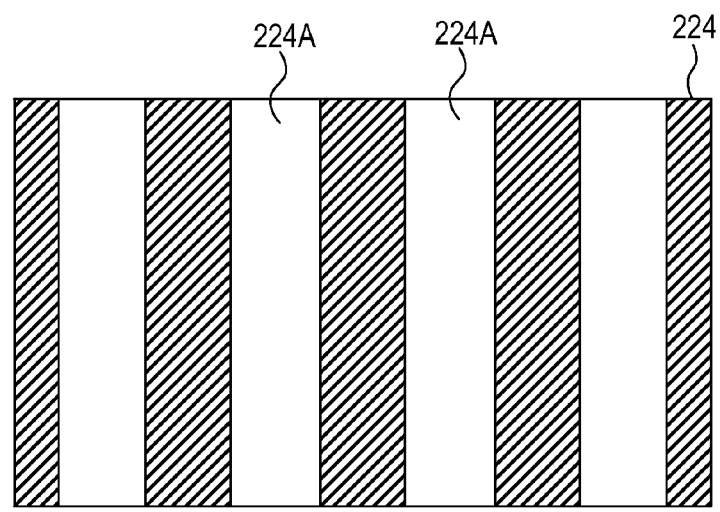
FIG. 5B is a sectional view illustrating the ink retaining member taken along the line VB-VB of FIG. 5A.

A lower surface of the filter member 223 is in press contact with an ink retaining member 224 capable of retaining ink therein. FIG. 5A is an enlarged perspective view of the ink retaining member illustrated in FIG. 4. FIG. 5B is a sectional view illustrating the ink retaining member taken along the line VB-VB of FIG. 5A. As illustrated in FIGS. 5A and 5B, a plurality of flow paths 224A that are circular in cross-section are formed in the ink retaining member 224. Each of the flow paths 224A has a diameter of about 1.0 mm.

Further, as illustrated in FIG. 4, an opening portion 225 is provided in an upper portion of the ink chamber 221. A filter 226 is provided in the opening portion 225. The opening portion 225 is configured to be coupled to a transportation portion (not shown) that is an outside flow path. The transportation portion is a flow path through which liquid and/or gas can be transported. The opening portion 225 is configured to cause the ink I and/or gas in the ink chamber 221 to flow to the outside, or, to cause liquid (such as ink) and/or gas outside the recording head 220 to flow into the ink chamber 221. In other words, the opening portion 225 is configured not only to cause liquid to solely flow out or flow in but also to cause gas to flow out or flow in together with the liquid.

By coupling the joint portion 232 of the ink tank 230 illustrated in FIG. 3 to the ink supply portion 222 of the recording head 220 illustrated in FIG. 4, the ink tank 230 illustrated in FIG. 3 is directly connected to the recording head 220 illustrated in FIG. 4. At this time, the filter 234 of the ink tank 230 illustrated in FIG. 3 and the filter member 223 of the recording head 220 illustrated in FIG. 4 are in press contact with each other in a vertical direction. The coupled portion between the ink tank and the recording head formed in this way can maintain airtightness thereof by being surrounded by an elastic cap member formed of rubber. The above-mentioned structure in which the recording head and the ink tank are directly connected with each other is preferred in that an ink supply path (liquid supply path) therebetween can be extremely short.

(3-2) Entire Structure of Recording Apparatus

Structures and the like of other portions of the ink-jet recording apparatus are not particularly limited. For example, a recording apparatus 300 illustrated in FIG. 6 can be suitably used.

Figure 6:
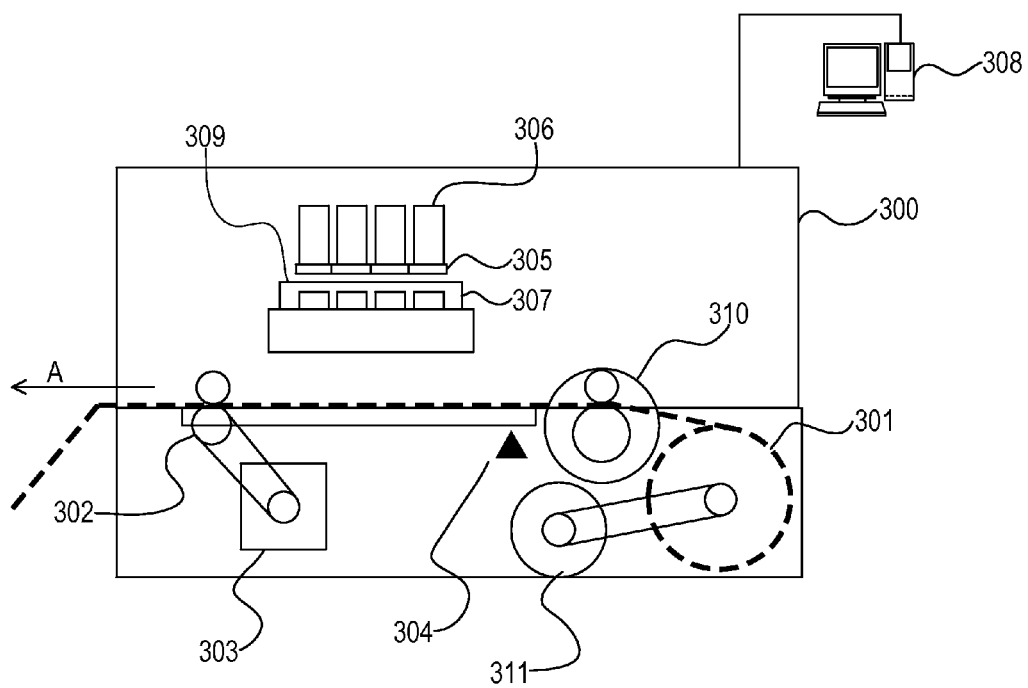
FIG. 6 is a schematic structural view schematically illustrating an entire structure of an ink-jet recording apparatus.

FIG. 6 is a schematic structural view schematically illustrating an entire structure of the ink-jet recording apparatus. An outside host apparatus (computer apparatus 308) is connected to the recording apparatus 300. The recording apparatus 300 is configured to eject, based on recording data that is input from the computer apparatus 308, ink from recording heads 305 to record an image.

In the recording apparatus 300, label paper to which a plurality of labels are temporarily affixed is used as a recording medium 301. The recording medium 301 is set in a state of being rolled into a roll shape. However, in the ink-jet recording apparatus according to the present invention, as the recording medium, not only paper but also any material such as cloth, a plastic film, a metal plate, glass, ceramic, wood, or leather may be used insofar as the material can receive ink.

The recording apparatus 300 includes, as a conveyance unit for conveying the recording medium 301, a conveyance motor 303, a conveyance roller 302, a rotary encoder 310, and a roll motor 311. By driving the conveyance roller 302 by the conveyance motor 303, the recording medium 301 can be conveyed at a uniform speed in a direction indicated by the arrow A. The rotary encoder 310 can detect the speed and the amount of conveyance of the recording medium 301. The recording medium 301 can be rolled again by the roll motor 311 in a direction opposite to the direction indicated by the arrow A. A sheet detection sensor 304 is a sensor for detecting a specific portion of the recording medium 301. In the illustrated example, leading edges of the respective labels that are temporarily affixed to the label paper are detected. The timing of recording an image can be determined based on the above-mentioned detection.

The recording apparatus 300 includes, in an upper portion thereof, four recording heads 305 and ink tanks 306 corresponding thereto, respectively. The four recording heads are recording heads for ejecting ink of black, cyan, magenta, and yellow, respectively.

The recording head 305 is a so-called line type head formed so as to have a width larger than a maximum recording width of the recording medium 301, and includes a plurality of nozzles capable of ejecting ink. The ink ejection orifices of the nozzles are open on a lower surface side of the recording head 305. The recording head 305 is disposed so that a longitudinal direction thereof is along a direction intersecting a direction of conveyance of the recording medium 301 (direction orthogonal to the direction indicated by the arrow A in FIG. 6), and the plurality of nozzles are arranged along the longitudinal direction to form the nozzle array.

In the recording apparatus 300, the conveyance roller 302 is driven by the conveyance motor 303, and the conveyance roller 302 conveys the recording medium 301 at a uniform speed in the direction indicated by the arrow A. When the specific portion of the recording medium 301 is detected by the sheet detection sensor 304, based on the detection position, ink is ejected in sequence from the ink ejection orifices of the four recording heads 305. At this time, ink is supplied from the ink tanks 306 to the recording heads 305. In this way, when the recording medium 301 passes under the recording heads 305, ink is ejected from the plurality of nozzles of the recording heads 305 to record an image on the recording medium 301. Note that, the recording heads 305 are line type heads, and thus, eject ink in a state of being fixed at a predetermined position. In other words, the recording heads 305 do not eject ink while being horizontally reciprocated like serial heads.

The recording apparatus 300 includes, as a recovery mechanism for carrying out recovery operation of the recording head 305, a capping mechanism 307, a blade 309, and the like.

The recovery operation is operation for causing the recording head 305 to recover so as to exhibit ejection performance that is as adequate as that in an initial state. The recovery operation may be, for example, suction recovery, pressurization recovery, preparatory ejection, or wiping recovery. The suction recovery is operation to remove, by suction with the capping mechanism 307, thickened ink in the nozzle of the recording head 305. The pressurization recovery is operation to discharge, by pressurization, thickened ink in the nozzle of the recording head 305 to the capping mechanism 307. The preparatory ejection is operation to discharge thickened ink in the nozzle to the capping mechanism 307 by ejection to stabilize an ink meniscus. The wiping recovery is operation to wipe a face surface of the recording head with the blade 309 to remove dust and ink adhering to the face surface. Those kinds of recovery operation may be used in combination.

The capping mechanism 307 is a mechanism for capping ink ejection orifices of the recording heads 305, and is disposed below the recording heads 305. The recording heads 305 and the capping mechanism 307 are configured to relatively move in right and left directions in FIG. 6. On the other hand, the blade 309 is a member for wiping the face surfaces of the recording heads 305, and is disposed below the recording heads 305.

When the suction recovery is performed, under a state in which the recording head 305 is capped by the capping mechanism 307, inside of a buffer tank (not shown) of the capping mechanism 307 is depressurized by a tube pump (not shown). In this way, thickened ink in the nozzle of the recording head 305 is removed by suction with the capping mechanism 307, to thereby refresh the inside of the nozzle.

When the pressurization recovery is performed, under a state in which the recording head 305 is capped by the capping mechanism 307, the inside of the nozzle of the recording head 305 is pressurized. In this way, thickened ink in the nozzle is discharged into a cap of the capping mechanism 307 by pressurization, to thereby refresh the inside of the nozzle.

When the wiping recovery is performed, the blade 309 is driven by a blade motor (not shown), and the face surface of the nozzle of the recording head 305 is wiped. Further, pressurization recovery (preparatory ejection) is performed. In this way, the face surface of the nozzle is cleaned and a meniscus in the ink ejection orifice is stabilized.

Note that, ink accumulated in the capping mechanism 307 by those kinds of recovery operation is sucked by a tube pump (not shown) when the accumulation reaches a predetermined amount, and thus discarded in a waste ink tank (not shown).

(3-3) Control System

Figure 7:
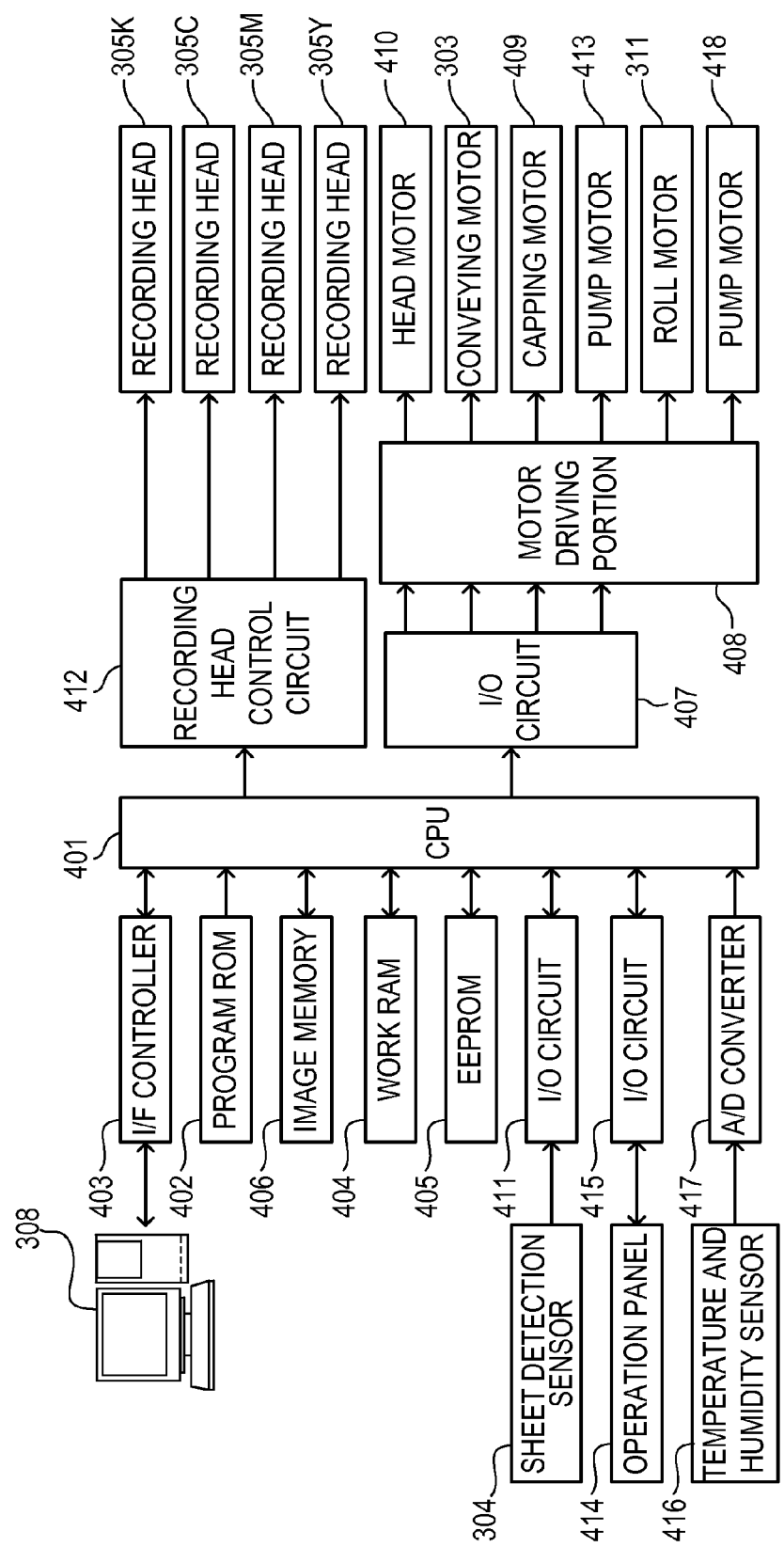
FIG. 7 is a block diagram illustrating a control system of the recording apparatus illustrated in FIG. 6.

Next, control of the ink-jet recording apparatus is described. FIG. 7 is a block diagram illustrating a control system of the recording apparatus illustrated in FIG. 6. The recording apparatus includes, in addition to a recording mechanism including the recording head, control system components such as a central processing unit (CPU), a USB interface portion, and a ROM. A CPU 401 runs a program stored in a program ROM 402 to control portions of the recording apparatus. The program ROM 402 stores a program and data for controlling the recording apparatus. Processing by the recording apparatus is realized by the CPU 401 that reads and runs a program in the program ROM 402.

The recording data that is output from the computer apparatus 308 is input to an interface controller 403 of the recording apparatus. Commands for instructing the number, the kind, the size, and the like of the recording medium (labels) are also input to the interface controller 403 and are analyzed. In addition to analysis of those commands, the CPU 401 executes arithmetic processing for controlling the entire recording apparatus, such as input of recording data, recording operation, and handling of a recording medium. The arithmetic processing is executed based on processing programs stored in the program ROM 402. The programs include a program corresponding to a procedure in a flow chart of FIG. 8 to be described below. Further, as a work memory for the CPU 401, a work RAM 404 is used. An EEPROM 405 is a rewritable nonvolatile memory. In the EEPROM 405, parameters unique to the recording apparatus are stored, such as time at which the previous recovery operation is carried out, and correction values for finely adjusting distances among the plurality of recording heads and a recording position in the direction of conveyance (registration in a longitudinal direction).

More specifically, the CPU 401 analyzes the input commands, and after that, expands image data of respective color components of the recording data into a bitmap in an image memory 406. Based on the data, an image is rendered. Further, the CPU 401 controls the conveyance motor 303, the roll motor 311, a capping motor 409, a head motor 410, and a pump motor 418 via an input/output circuit 407 and a motor drive portion 408. The capping motor 409 is a motor for driving the capping mechanism 307. The head motor 410 is a motor for moving recording heads 305K, 305Y, 305M, and 305C. The pump motor 418 is a motor for driving the tube pump. The recording heads 305K, 305Y, 305M, and 305C are moved among a capping position, a recording position, and a recovery position. The capping position is a position at which capping is carried out by the capping mechanism 307. The recording position is a position at which an image is recorded. The recovery position is a position at which the recovery operation is carried out.

When an image is recorded by the recording apparatus, as illustrated in FIG. 6, the conveyance roller 302 is driven by the conveyance motor 303 to convey the recording medium 301 (in the illustrated example, label paper) at a uniform speed. Then, the rotary encoder 310 detects the speed and the amount of conveyance of the recording medium 301. In the control system illustrated in FIG. 7, in order to determine the timing of recording an image relative to the recording medium that is conveyed at the uniform speed, the sheet detection sensor 304 detects a leading edge of a label. A detection signal from the sheet detection sensor 304 is input to the CPU 401 via an input/output circuit 411. When the recording medium is conveyed by the conveyance motor, in synchronization with a signal from the rotary encoder (not shown), the CPU 401 reads image data for the respective colors in sequence from the image memory 406. The image data is transferred via a recording head control circuit 412 to any one of the recording heads 305K, 305Y, 305M, and 305C corresponding thereto. Thus, the recording heads 305K, 305Y, 305M, and 305C eject ink based on the image data.

Operation of a pump motor 413 for driving a pump is controlled via the input/output circuit 407 and the motor drive portion 408. An operating panel 414 is connected to the CPU 401 via an input/output circuit 415. Ambient temperature and ambient humidity of the recording apparatus are detected by a hygrothermosensor 416, and are input to the CPU 401 via an A/D converter 417.

(3-4) Recovery Sequence

When the ambient temperature becomes 40° C. or more and water evaporates, ink is more liable to stick to the recording head. Therefore, it is preferred to interpose a recovery sequence for recovering the face surface of the recording head when the head is in an open state in which the recording head is uncapped, and, at the same time, water evaporates.

Figure 8:
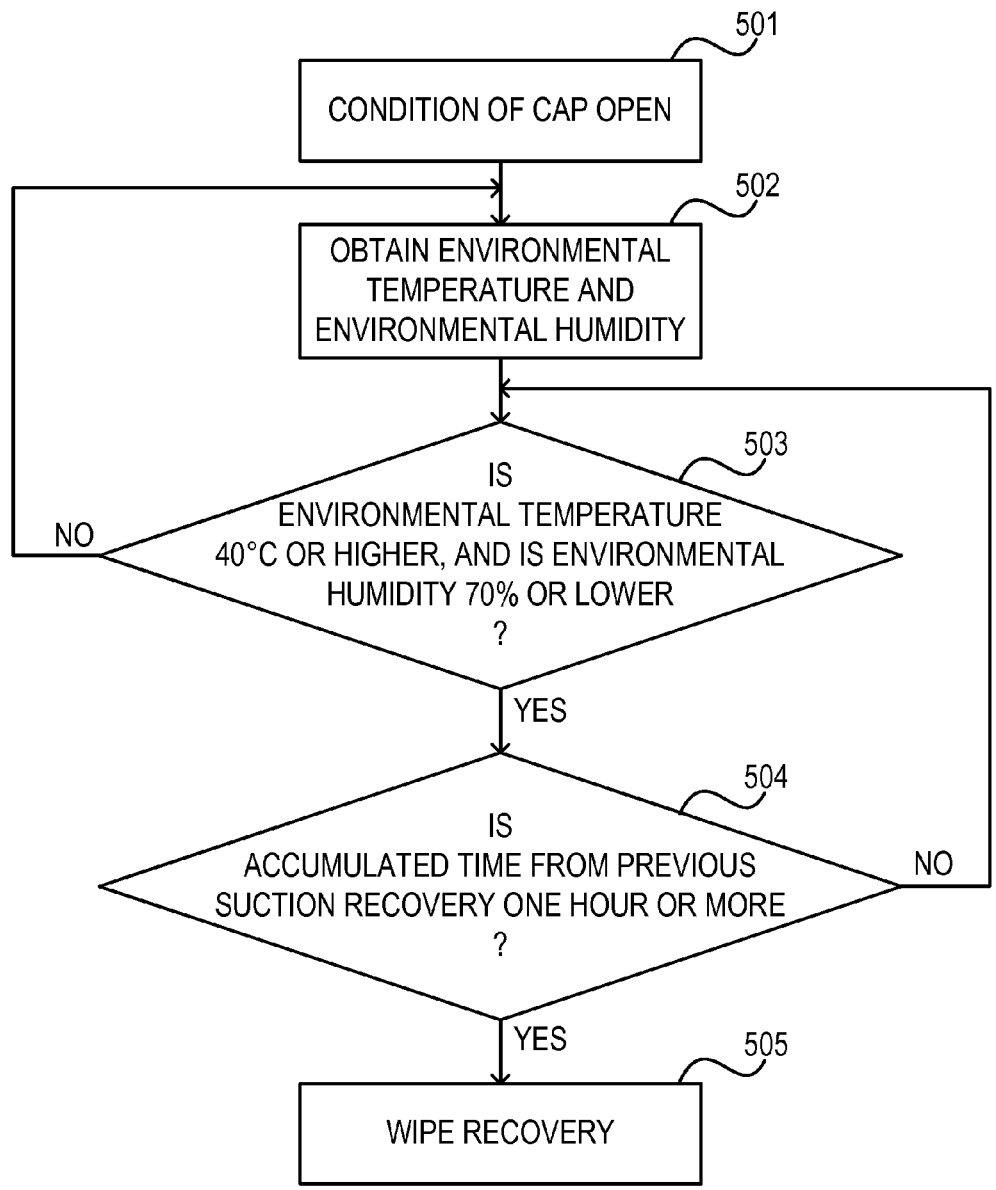
FIG. 8 is a flow chart illustrating steps of a recovery sequence of the recording head.

FIG. 8 is a flow chart illustrating steps of the recovery sequence of the recording head. The recovery sequence illustrated in FIG. 8 is triggered under a condition that the recording head is uncapped, i.e., under a cap open condition (Condition 501). When the recovery sequence is triggered, the hygrothermosensor obtains (detects) the ambient temperature and the ambient humidity of the recording apparatus (Step 502). As a result of the detection, when the ambient temperature is 40° C. or more and the ambient humidity is 70% or less (Condition 503), and at the same time, a cumulative amount of time from the previous suction recovery is one hour or more (Condition 504), pressurization recovery (preparatory ejection) for refreshing ink in the nozzle and wiping recovery for wiping and cleaning the face surface of the nozzle are carried out (Step 505). Note that, Condition 504 is reset when the suction recovery is carried out.

(4) Ink-Jet Recording Method

The ink-jet recording method according to the present invention has a feature in that recording is carried out by ejecting ink of the ink set from the recording head by using the ink-jet recording apparatus according to the present invention. The recording method can uniformly eject the respective colors of ink of the ink set and can effectively prevent lowering of quality of a printed image.

Now, the present invention is more specifically described by way of Examples and Comparative Examples. However, the present invention is not limited to only the constitutions of Examples below. Note that, "part(s)" and "%" in the following description refer to "part(s) by mass" and "mass %", respectively, unless otherwise stated.

(Evaluation of Dye for its Hydrophobicity)

In Examples and Comparative Examples below, C.I. Direct Blue 199 (DBL199), the compound M1 represented by the formula (4), and C.I. Direct Yellow 86 (DY86) were used as dyes. With regard to each of the dyes, an evaluation liquid was prepared by adding, to a 5 mass % aqueous solution of the dye, the compound C3 in an amount corresponding to 1 mass % of the aqueous solution. "Acetylenol E100" (having an average of U+V of 10) manufactured by Kawaken Fine Chemicals Co., Ltd. was used as the compound C3.

The surface tension γL of each evaluation liquid was measured, and the difference γL1–γL2 between the surface tensions γL of the evaluation liquids of the respective dyes was calculated and evaluated by the following evaluation criteria. Table 1 shows the results.

o: A relationship of γL1–γL2<10 (mN/m) is satisfied, i.e., there is no large difference between the degrees of hydrophobicity of dyes (hydrophobic interactions with surfactants).

x: A relationship of γL1–γL2≥10 (mN/m) is satisfied, i.e., the degrees of hydrophobicity of dyes (hydrophobic interactions with surfactants) largely differ from each other.

TABLE 1

| Kind of dye | Surface tension of evaluation liquid γL mN/m | Difference between surface tensions of evaluation liquids γL1-γL2 (mN/m) | | |
|---|---|---|---|---|
| | | With respect to DBL199 | With respect to magenta dye M1 | With respect to DY86 |
| DBL199 | 27.7 | | 15.6 x | 2.1 o |
| Magenta dye M1 | 43.3 | 15.6 x | | 13.5 x |
| DY86 | 29.8 | 2.1 o | 13.5 x | |

As shown in Table 1, there is said to be no large difference in degree of hydrophobicity between the dyes DBL199 and DY86. On the other hand, the compound M1 has high hydrophobicity, and hence the DBL199 and the compound M1, or the DY86 and the compound M1, as dyes are said to largely differ from each other in degree of hydrophobicity. Inks 1 to 10 were prepared below by using the DBL199 and the compound M1 largely differing from each other in degree of hydrophobicity.

(Ink 1)

An ink 1 was prepared by the following method. 3.5 Parts of the DBL199, 0.2 part of acetylene glycol (having an EO addition number of 10), 7.0 parts of glycerin, 9.0 parts of ethylene urea, 5.0 parts of 2-pyrrolidone, 3.0 parts of triethylene glycol, and 72.3 parts of water were mixed, and the pH of the mixture was adjusted to 8.0 with an aqueous solution of sodium hydroxide. After that, the contents were dissolved by being sufficiently stirred, and the solution was filtered under pressure with a microfilter having a pore size of 0.2 μm (manufactured by FUJIFILM Corporation) to prepare the ink 1. "Acetylenol E100" (having an average of U+V of 10) manufactured by Kawaken Fine Chemicals Co., Ltd. was used as acetylene glycol (having an EO addition number of 10). The viscosity η and surface tension γ of the ink 1 were measured. Table 2 shows the results.

TABLE 2

| | Ink | | | | | | | | |
|---|---|---|---|---|---|---|---|---|---|
| | 1 | 2 | 3 | 4 | 5 | 6 | 7 | 8 | 9 |
| DBL199 | 3.5 | 3.5 | 3.5 | | | | 3.5 | 3.5 | |
| Compound M1 | | | | 3.5 | 3.5 | 3.5 | | | 3.5 |
| Acetylene glycol (having an EO addition number of 10) | 0.2 | | | 0.2 | | | | 0.2 | 1.4 |
| Acetylene glycol (having an EO addition number of 6) | | 0.2 | | | 0.2 | | 0.1 | | |
| Acetylene glycol (having an EO addition number of 4) | | | 0.2 | | | 0.2 | 0.1 | | |
| Glycerin | 7.0 | 7.0 | 7.0 | 7.0 | 7.0 | 7.0 | 7.0 | 14.0 | 7.0 |
| Ethylene urea | 9.0 | 9.0 | 9.0 | 9.0 | 9.0 | 9.0 | 9.0 | 9.0 | 9.0 |
| 2-Pyrrolidone | 5.0 | 5.0 | 5.0 | 5.0 | 5.0 | 5.0 | 5.0 | 5.0 | 5.0 |
| Triethylene glycol | 3.0 | 3.0 | 3.0 | 3.0 | 3.0 | 3.0 | 3.0 | 3.0 | 3.0 |
| Water | 72.3 | 72.3 | 72.3 | 72.3 | 72.3 | 72.3 | 72.3 | 65.3 | 71.1 |
| Viscosity η (mPa·s) | 2.2 | 2.2 | 2.2 | 2.0 | 2.0 | 2.0 | 2.1 | 3.2 | 2.6 |

TABLE 2-continued

|  | Ink | | | | | | | | |
|---|---|---|---|---|---|---|---|---|---|
|  | 1 | 2 | 3 | 4 | 5 | 6 | 7 | 8 | 9 |
| Surface tension γ (mN/m) | 40.2 | 38.2 | 36.5 | 44.8 | 41.5 | 40.8 | 37 | 40.3 | 38.8 |

(Inks 2 to 9)

Inks 2 to 9 were prepared in the same manner as in the preparation of the ink 1 except that the constituent components of the ink were changed to components shown in Table 2. "Acetylenol E60" (having an average of U+V of 6) manufactured by Kawaken Fine Chemicals Co., Ltd. was used as acetylene glycol (having an EO addition number of 6). "Acetylenol E40" (having an average of U+V of 4) manufactured by Kawaken Fine Chemicals Co., Ltd. was used as acetylene glycol (having an EO addition number of 4). The viscosities η and surface tensions γ of the inks 2 to 9 were also measured. Table 2 shows the results.

(Recording Head)

The recording apparatus 300 illustrated in FIG. 6, specifically an ink-jet recording apparatus of a thermal system ("LX-D5500" manufactured by CANON FINETECH INC.) was used as an ink-jet recording apparatus. A recording head for the ink-jet recording apparatus was used as a recording head. A recording head having a nozzle structure illustrated in each of FIGS. 1A to 1C and having an entire structure illustrated in each of FIGS. 2A to 2C was produced. The opening area of an ink ejection orifice was set to 225 μm² and a structure in which 4,800 nozzles formed a nozzle array was adopted. The length of the nozzle array was set to 4 inches. The resolution of the head was set to 1,200 dpi. In the recording head, a water-repellent region is formed on the circumference of the ink ejection orifice.

Example 1

The ink 1 and the ink 5 were combined to provide an ink set in which inks of two colors were combined. The ink 1 and the ink 5 were each injected into an ink tank, the ink tank was connected to the recording apparatus 300 illustrated in FIG. 6, and the ink 1 and the ink 5 were filled into the nozzle flow paths of the recording head by a suction operation.

Examples 2 to 5 and Comparative Examples 1 to 8

Ink filling was performed in the same manner as in Example 1 except that the combination of the inks of two colors was changed to combinations shown in Table 3.

The ink sets of Examples and Comparative Examples were each evaluated for whether a reduction in image quality occurred owing to a difference in wettability between inks by the following method. Table 3 shows the results.

(Evaluation for Image Quality)

The ink set shown in Table 3 was charged into an ink cartridge and a solid image having a duty of each ink of 50% was formed with the recording apparatus ("LX-D5500" manufactured by CANON FINETECH INC.). Printing performed here was continuous printing at a conveying speed of 150 mm/s or 50 mm/s. Recording dot arrangement at this time was such zigzag arrangement that dots of the same ink were not adjacent to each other in a matrix unit of 1,200×1,200 dpi, and ink dots were arranged so as not to impinge on the same point. Thus, a solid image in which the total duty of the ink set was 100% was formed. A matte label (4×5 inches) and synthetic paper label (4×5 inches) included with the recording apparatus ("LX-D5500" manufactured by CANON FINETECH INC.) were used as recording media. White haze and color unevenness were evaluated every time the image was continuously printed on 100 labels of 4×5 inches, and the evaluation was continued until the image was continuously printed on 1,000 sheets.

o (Excellent): The white haze or the color unevenness hardly occurs even after the printing on the 1,000 sheets.

Δ (Good): The white haze or the color unevenness slightly occurs along a fiber of the paper during the printing on the 1,000 sheets, but is at such a level that substantially no problem arises.

x (Poor): The white haze or the color unevenness remarkably occurs along a fiber of the paper during the printing on the 1,000 sheets.

xx (Very poor): The color unevenness occurs on the first sheet (at the initial stage of the printing).

TABLE 3

|  | Ink | | Difference between surface tensions of evaluation liquids | EO addition number | Surface tension | Viscosity | Image quality | | | |
|---|---|---|---|---|---|---|---|---|---|---|
|  | | | | | | | Conveying speed 150 mm/s | | Conveying speed 50 mm/s | |
|  | (I) | (II) | γL1 − γL2 (mN/m) | difference S2 − S1 | difference (mN/m) | difference (mPa·s) | Matte paper | Synthetic paper | Matte paper | Synthetic paper |
| Example 1 | Ink 5 | Ink 1 | 15.6 | 4 | 1.3 | 0.2 | o | o | o | o |
| Example 2 | Ink 6 | Ink 1 | 15.6 | 6 | 0.6 | 0.2 | o | o | o | o |
| Example 3 | Ink 6 | Ink 2 | 15.6 | 2 | 2.6 | 0.2 | o | o | o | o |
| Example 4 | Ink 5 | Ink 8 | 15.6 | 4 | 1.2 | 1.2 | Δ | Δ | o | o |
| Example 5 | Ink 6 | Ink 8 | 15.6 | 6 | 0.5 | 1.2 | Δ | Δ | o | o |
| Comparative Example 1 | Ink 4 | Ink 1 | 15.6 | 0 | 4.6 | 0.2 | x | x | x | x |
| Comparative Example 2 | Ink 4 | Ink 2 | 15.6 | −4 | 5.6 | 0.2 | x | x | x | x |

TABLE 3-continued

| | Ink | | Difference between surface tensions of evaluation liquids | Ink EO addition number | Surface tension difference | Viscosity difference | Image quality | | | |
|---|---|---|---|---|---|---|---|---|---|---|
| | | | | | | | Conveying speed 150 mm/s | | Conveying speed 50 mm/s | |
| | (I) | (II) | γL1 − γL2 (mN/m) | S2 − S1 | (mN/m) | (mPa·s) | Matte paper | Synthetic paper | Matte paper | Synthetic paper |
| Comparative Example 3 | Ink 5 | Ink 2 | 15.6 | 0 | 3.3 | 0.2 | x | x | Δ | Δ |
| Comparative Example 4 | Ink 4 | Ink 3 | 15.6 | −6 | 8.3 | 0.1 | xx | x | x | x |
| Comparative Example 5 | Ink 5 | Ink 3 | 15.6 | −2 | 5 | 0.1 | x | x | x | x |
| Comparative Example 6 | Ink 6 | Ink 3 | 15.6 | 0 | 4.3 | 0.1 | x | x | x | x |
| Comparative Example 7 | Ink 5 | Ink 7 | 15.6 | 1 | 4.5 | 0.1 | x | Δ | Δ | Δ |
| Comparative Example 8 | Ink 9 | Ink 1 | 15.6 | 0 | 2.4 | 0.4 | x | Δ | Δ | Δ |

As shown in Table 3, in each of the ink sets of Examples 1 to 5, the EO addition numbers of the acetylene glycol-based surfactants of the ink (I) and the ink (II) were caused to differ from each other by from 2 or more to 7 or less. As a result, the wettabilities of the ink (I) and the ink (II) were uniformized, and a reduction in printing quality of the image due to the occurrence of the color unevenness or the white haze was at such a level that substantially no problem arose. Accordingly, each of the ink sets showed good evaluation results. That is, it is assumed that the ink (II) containing a dye having high hydrophobicity (the compound M1) and the ink (I) containing any other dye can be uniformly ejected.

In each of Comparative Examples 1, 3, and 6, the EO addition numbers of the acetylene glycol-based surfactants of the ink (I) and the ink (II) were not caused to differ from each other. As a result, differences in surface tension and wettability between the ink (I) and the ink (II) enlarged, and hence the image quality reduced. In each of Comparative Examples 2, 4, and 5, the EO addition numbers of the acetylene glycol-based surfactants of the ink (I) and the ink (II) were caused to differ from each other, but when a relationship of γL1−γL2≥10 was satisfied, a relationship of S2−S1<0 was satisfied. As a result, differences in surface tension and wettability between the ink (I) and the ink (II) additionally enlarged, and hence the image quality reduced.

In Comparative Example 7, the EO addition numbers of the acetylene glycol-based surfactants of the ink (I) and the ink (II) differed from each other by 1, and the difference was not 2 or more. As a result, differences in surface tension and wettability between the ink (I) and the ink (II) reduced, but the image quality was not sufficiently satisfactory. In Comparative Example 8, the EC) addition numbers of the acetylene glycol-based surfactants of the ink (I) and the ink (II) were not caused to differ from each other, but the amounts of the surfactants were caused to differ from each other. As a result, a difference in surface tension between the ink (I) and the ink (II) reduced, but differences in viscosity and wettability between the inks enlarged, and hence the image quality reduced.

The present invention can be suitably used in an ink set containing a dye having high hydrophobicity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-185463, filed Sep. 6, 2013, which is hereby incorporated by reference herein in its entirety.

REFERENCE SIGNS LIST

110: base plate, 111: heater substrate, 112: common liquid chamber, 113: top board member, 115: liquid supply member, 116: liquid supply case, 117: liquid supply case cover, 118: supply filter, 119: discharge filter, 120: gas-liquid separation portion, 121: liquid surface detection sensor, 123: upper limit detection electrode, 124: ground electrode, 125: lower limit detection electrode, 126: main liquid supply chamber, 127: liquid supply port, 129: main liquid supply chamber inclination, 130: air communication portion, 131: liquid communication portion, 132: supply joint, 133: discharge joint, 134: first liquid supply chamber, 135: second liquid supply chamber, 136: second liquid supply chamber opening, 137: liquid supply path, 138: second liquid supply chamber inclination, 139: ink ejection orifice arrangement surface, 141: air chamber, 151: ink ejection orifice, 152: heater, 153: nozzle wall, 155: nozzle filter, 157: heater center, 159: nozzle flow path, 162: nozzle top board, 164: nozzle bottom board, 171: ejection orifice width, 172: ejection orifice height, 181: nozzle front portion, 182: nozzle back portion, 220: recording head, 220A: ejection orifice, 221: ink chamber, 222: ink supply portion, 223: filter member, 224: ink retaining member, 224A: flow path, 225: opening portion, 226: filter, 230: ink tank, 231: ink chamber, 232: joint portion, 233: negative pressure generation portion, 233-1: spring, 233-2: pressure plate, 234: filter, 300: recording apparatus, 301: recording medium, 302: conveyance roller, 303: conveyance motor, 304: sheet detection sensor, 305, 305K, 305Y, 305M, 305C: recording head, 306: ink tank, 307: capping mechanism, 308: computer apparatus, 309: blade, 310: rotary encoder, 311: roll motor, 401: CPU, 402: program ROM, 403: interface controller, 404: work RAM, 405: EEPROM, 406: image memory, 407: input/output circuit, 408: motor drive portion, 409: capping motor, 410: head motor, 411: input/output circuit, 412: recording head control circuit, 413: pump motor, 414: operating panel, 415: input/output circuit, 416: hygrothermosensor, 417: A/D converter, 418: pump motor, 501: condition, 502: step, 503: condition, 504: condition, 505: step, I: ink

What is claimed is:

1. An ink-jet recording ink set, comprising a combination of inks of a plurality of colors having different hues,
wherein an ink (I) as an ink of one color selected from the inks of the plurality of colors comprises an ink containing a dye D1, a compound C1 represented by the following general formula (1) and having an ethylene oxide average addition number U+V of S1, and water,
wherein an ink (II) as an ink of one color except the ink (I) selected from the inks of the plurality of colors comprises an ink containing a dye D2, a compound C2 represented by the following general formula (1) and having an ethylene oxide average addition number U+V of S2, and water, and
wherein in case that a surface tension γL1 (mN/m) of an evaluation liquid L1 obtained by adding, to a 5 mass % aqueous solution of the dye D1, a compound C3 represented by the following general formula (1) and having an ethylene oxide average addition number U+V of 10 in an amount corresponding to 1 mass % of the aqueous solution, and a surface tension γL2 (mN/m) of an evaluation liquid L2 obtained by adding, to a 5 mass % aqueous solution of the dye D2, the compound C3 in an amount corresponding to 1 mass % of the aqueous solution satisfy a relationship of γL1−γL2≥10 (mN/m), the ethylene oxide average addition number S1 of the compound C1 incorporated into the ink (I) and the ethylene oxide average addition number S2 of the compound C2 incorporated into the ink (II) satisfy a relationship of 2≤S2−S1≤7.

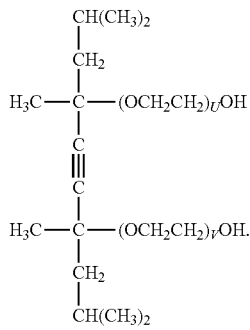

General formula (1)

2. The ink set according to claim 1,
wherein the ink (I) and the ink (II) each further contain a water-soluble compound, and
wherein the water-soluble compound comprises at least one kind selected from the group consisting of a water-soluble organic solvent and a water-soluble compound that is solid at 25° C.

3. The ink set according to claim 1,
wherein each of a viscosity η1 of the ink (I) and a viscosity η2 of the ink (II) is from 1.5 mPa·s or more to 5.0 mPa·s or less, and
wherein a difference between the viscosity η1 of the ink (I) and the viscosity η2 of the ink (II) is 0.3 mPa·s or less.

4. The ink set according to claim 1,
wherein each of viscosities η of the plurality of kinds of inks constituting the ink set is from 1.5 mPa·s or more to 5.0 mPa·s or less, and
wherein a difference between the viscosities of any two inks selected from the plurality of kinds of inks is 0.3 mPa·s or less.

5. The ink set according to claim 1,
wherein each of a surface tension γ1 of the ink (I) and a surface tension γ2 of the ink (II) is from 25 mN/m or more to 45 mN/m or less, and
wherein a difference between the surface tension γ1 of the ink (I) and the surface tension γ2 of the ink (II) is 3.5 mN/m or less.

6. The ink set according to claim 1,
wherein each of surface tensions γ of the plurality of kinds of inks constituting the ink set is from 25 mN/m or more to 45 mN/m or less, and
wherein a difference between the surface tensions of any two inks selected from the plurality of kinds of inks is 3.5 mN/m or less.

7. A recording head for ink-jet recording, comprising a combination of a plurality of line type heads each comprising:
a nozzle array including a plurality of nozzle flow paths partitioned by nozzle walls;
a plurality of ink ejection orifices communicating with the plurality of nozzle flow paths, respectively; and
a heater for ink ejection disposed in each of the plurality of nozzle flow paths,
each of the plurality of ink ejection orifices having an opening area of from 100 μm² or more to 350 μm² or less, the nozzle array having a total number of nozzles of 1,200 or more and a length of 2 inches or more,
each of the plurality of line type heads having internal space communicating with the plurality of ink ejection orifices, which is filled with an ink for the ink-jet recording, the ink of only one color being filled in the each of the plurality of line type heads, the plurality of line type heads being filled with inks of different hues, respectively, to form an ink set of a combination of inks of a plurality of colors in the recording head,
the ink set comprising the ink set according to claim 1.

8. The recording head according to claim 7, wherein the each of the plurality of line type heads further comprises:
a common liquid chamber communicating with the plurality of nozzle flow paths forming the nozzle array;
a liquid supply port communicating with the common liquid chamber;
a main liquid supply chamber communicating with the liquid supply port;
a liquid supply path communicating with the main liquid supply chamber;
a liquid supply chamber communicating with the liquid supply path;
a supply filter provided so as to partition the liquid supply chamber into a first liquid supply chamber and a second liquid supply chamber from an upstream side along a flow during supply of liquid;
a gas-liquid separation portion provided in part of the main liquid supply chamber; and
an air chamber communicating with the gas-liquid separation portion,
the plurality of nozzle flow paths, the common liquid chamber, the liquid supply port, the main liquid supply chamber, the liquid supply path, the liquid supply chamber, the supply filter, the gas-liquid separation portion, and the air chamber being disposed on a plane parallel to a plane including an arrangement direction of the plurality of nozzle flow paths and an ejection direction of the liquid,
the main liquid supply chamber, the liquid supply path, the supply filter, the gas-liquid separation portion, and the air chamber being disposed without being laminated respectively.

9. An ink-jet recording apparatus, comprising:
a recording head for ink-jet recording; and
an ink storage portion for storing ink to be supplied to the recording head,
wherein the recording head comprises the recording head according to claim 7, and the ink-jet recording apparatus comprises a plurality of the ink storage portions corresponding to the plurality of line type heads, respectively.

10. An ink-jet recording method, comprising carrying out recording with use of the ink-jet recording apparatus according to claim 9 by ejecting ink of the ink set from the recording head.

\* \* \* \* \*